United States Patent
Kamada et al.

(10) Patent No.: US 12,088,965 B2
(45) Date of Patent: Sep. 10, 2024

(54) MONITORING CAMERA VIDEO SHARING SYSTEM AND MONITORING CAMERA VIDEO SHARING METHOD

(71) Applicant: i-PRO CO., LTD., Tokyo (JP)

(72) Inventors: Haru Kamada, Fukuoka (JP); Takeshi Wakako, Fukuoka (JP); Koji Kawamoto, Fukuoka (JP); Kaoru Tsurumi, Fukuoka (JP); Masaki Yamaguchi, Fukuoka (JP)

(73) Assignee: i-PRO CO., LTD., Tokyo (JP)

( * ) Notice: Subject to any disclaimer, the term of this patent is extended or adjusted under 35 U.S.C. 154(b) by 0 days.

(21) Appl. No.: 17/979,930

(22) Filed: Nov. 3, 2022

(65) Prior Publication Data

US 2023/0142199 A1 May 11, 2023

(30) Foreign Application Priority Data

Nov. 5, 2021 (JP) .................................. 2021-181104

(51) Int. Cl.
*H04N 7/18* (2006.01)

(52) U.S. Cl.
CPC .................................. *H04N 7/181* (2013.01)

(58) Field of Classification Search
None
See application file for complete search history.

(56) References Cited

U.S. PATENT DOCUMENTS 7,856,643 B2 * 12/2010 Machinist ........ G08B 13/19647
725/14
2006/0279628 A1 * 12/2006 Fleming ................... H04N 5/76
348/E7.086
2009/0240695 A1 * 9/2009 Angell ..................... G06F 16/70
2012/0314018 A1 * 12/2012 Wengrovitz ........... H04N 7/181
348/E7.083
2013/0067029 A1 * 3/2013 Osuka ..................... H04L 67/04
709/217
2013/0308000 A1 * 11/2013 Kitajima ................. G06F 21/31
348/207.1
2014/0267567 A1 * 9/2014 Mihara ............... H04L 65/4025
348/14.08

(Continued)

FOREIGN PATENT DOCUMENTS

JP          2016-116125          6/2016

*Primary Examiner* — Daniel T Tekle
(74) *Attorney, Agent, or Firm* — Greenblum & Bernstein, P.L.C.

(57) ABSTRACT

A monitoring camera video sharing system includes a user terminal for viewing of video data of a monitoring camera, and a server for storing access permission data including first user information and monitoring camera information. The first user information includes an access right to the video data of the monitoring camera, and the monitoring camera information indicates information of the monitoring camera. The server updates the access permission data by adding an access right to the video data of the selected monitoring camera to second user information based on sharing processing of the access permission data to the second user information, and sets the video data of the selected monitoring camera linked to the access permission data and specified by the monitoring camera information such that the video data of the selected monitoring camera is accessible by the user terminal based on the second user information.

15 Claims, 13 Drawing Sheets

(56) References Cited

U.S. PATENT DOCUMENTS

| | | | |
|---|---|---|---|
| 2016/0173578 A1* | 6/2016 | Sharma | H04L 51/00 709/203 |
| 2017/0006327 A1* | 1/2017 | Aghdasi | H04N 21/6175 |
| 2018/0139416 A1* | 5/2018 | Hirasawa | G08B 25/00 |
| 2018/0220189 A1* | 8/2018 | Hodge | G06Q 50/18 |
| 2020/0162458 A1* | 5/2020 | Setlur | G08B 13/19656 |

* cited by examiner

MONITORING CAMERA VIDEO SHARING SYSTEM AND MONITORING CAMERA VIDEO SHARING METHOD

CROSS-REFERENCE TO RELATED APPLICATIONS

This application is based on and claims priority under 35 USC 119 from Japanese Patent Application No. 2021-181104 filed on Nov. 5, 2021, the contents of which are incorporated herein by reference.

TECHNICAL FIELD

The present disclosure relates to a monitoring camera video sharing system and a monitoring camera video sharing method.

BACKGROUND ART

Patent Literature 1 discloses a system including a monitoring camera that communicates with an external terminal, and an image management server that communicates with the external terminal and the monitoring camera. When image data of a monitoring camera belonging to a group to which the monitoring camera belongs is requested from the external terminal, the image management server transmits, to the external terminal, an electronic file that includes connection information for acquiring the image data of the monitoring camera belonging to the group. The connection information is, for example, link information such as a uniform resource locator (URL) of the image data.

CITATION LIST

Patent Literature

Patent Literature 1: JP2016-116125A

SUMMARY OF INVENTION

In a configuration described in Patent Literature 1, if the external terminal requests image data from a monitoring camera belonging to a group and does not acquire connection information (in other words, information of a right to acquire image data of another monitoring camera belonging to the group) to be acquired in response to the request, the external terminal cannot acquire image data of a series of monitoring cameras belonging to the group. Therefore, in an environment in which a plurality of monitoring cameras are disposed, a problem arises that not only corresponding connection information is required in order to acquire image data of each of the monitoring cameras, but also an administrator side makes a mistake in setting when setting a right for each monitoring camera. Therefore, it is difficult to efficiently share, with the external terminal, the image data of the monitoring camera belonging to the group, and there is room for improvement.

The present disclosure has been made in view of the above circumstances in the related art, and an object of the present disclosure is to provide a monitoring camera video sharing system and a monitoring camera video sharing method that improve efficiency of data sharing of a video of at least one monitoring camera.

The present disclosure provides a monitoring camera video sharing system including: one or more user terminals configured to enable viewing of video data of each of a plurality of monitoring cameras disposed in a target facility; and a server configured to store access permission data that includes at least first user information and monitoring camera information. The first user information includes an access right to the video data of each of the monitoring cameras, and the monitoring camera information indicates information of at least one selected monitoring camera selected by an operation of the user terminal based on the first user information. The server is configured to update the access permission data by adding an access right to the video data of the selected monitoring camera to second user information based on sharing processing of the access permission data to the second user information, and set the video data of the selected monitoring camera linked to the access permission data and specified by the monitoring camera information such that the video data of the selected monitoring camera is accessible by the user terminal based on the second user information. The sharing processing is performed by the operation of the user terminal based on the first user information.

The present disclosure also provides a monitoring camera video sharing method including: storing, in a server, access permission data that includes at least first user information and monitoring camera information, the first user information including an access right to video data of each of a plurality of monitoring cameras disposed in a target facility, and the monitoring camera information indicating information of at least one selected monitoring camera selected by an operation of a user terminal based on the first user information; updating the access permission data by adding an access right to the video data of the selected monitoring camera to second user information based on sharing processing of the access permission data to the second user information, the sharing processing being performed by the operation of the user terminal based on the first user information; and setting the video data of the selected monitoring camera linked to the access permission data and specified by the monitoring camera information such that the video data of the selected monitoring camera is accessible by the user terminal based on the second user information.

These comprehensive or specific aspects may be implemented by a system, a device, a method, an integrated circuit, a computer program, or a recording medium, or may be implemented by any combination of the system, the device, the method, the integrated circuit, the computer program, and the recording medium.

According to the present disclosure, it is possible to improve efficiency of data sharing of a video of at least one monitoring camera.

Further advantages and effects of an aspect of the present disclosure will become apparent from the description and the drawings. These advantages and/or effects are respectively provided by features described in several embodiments, the description, and the drawings, and it is not necessary to provide all of the advantages and/or effects in order to obtain one or more identical features.

DESCRIPTION OF EMBODIMENTS

Hereinafter, embodiments in which a monitoring camera video sharing system and a monitoring camera video sharing method according to the present disclosure are specifically disclosed will be described in detail with reference to the drawings as appropriate. However, unnecessarily detailed description may be omitted. For example, detailed description of a well-known matter or a repeated description of substantially the same configuration may be omitted. This is to avoid unnecessary redundancy in the following description and to facilitate understanding for those skilled in the art. The accompanying drawings and the following description are provided for those skilled in the art to fully understand the present disclosure, and are not intended to limit the subject matters described in the claims.

System Configuration Example

Figure 1:
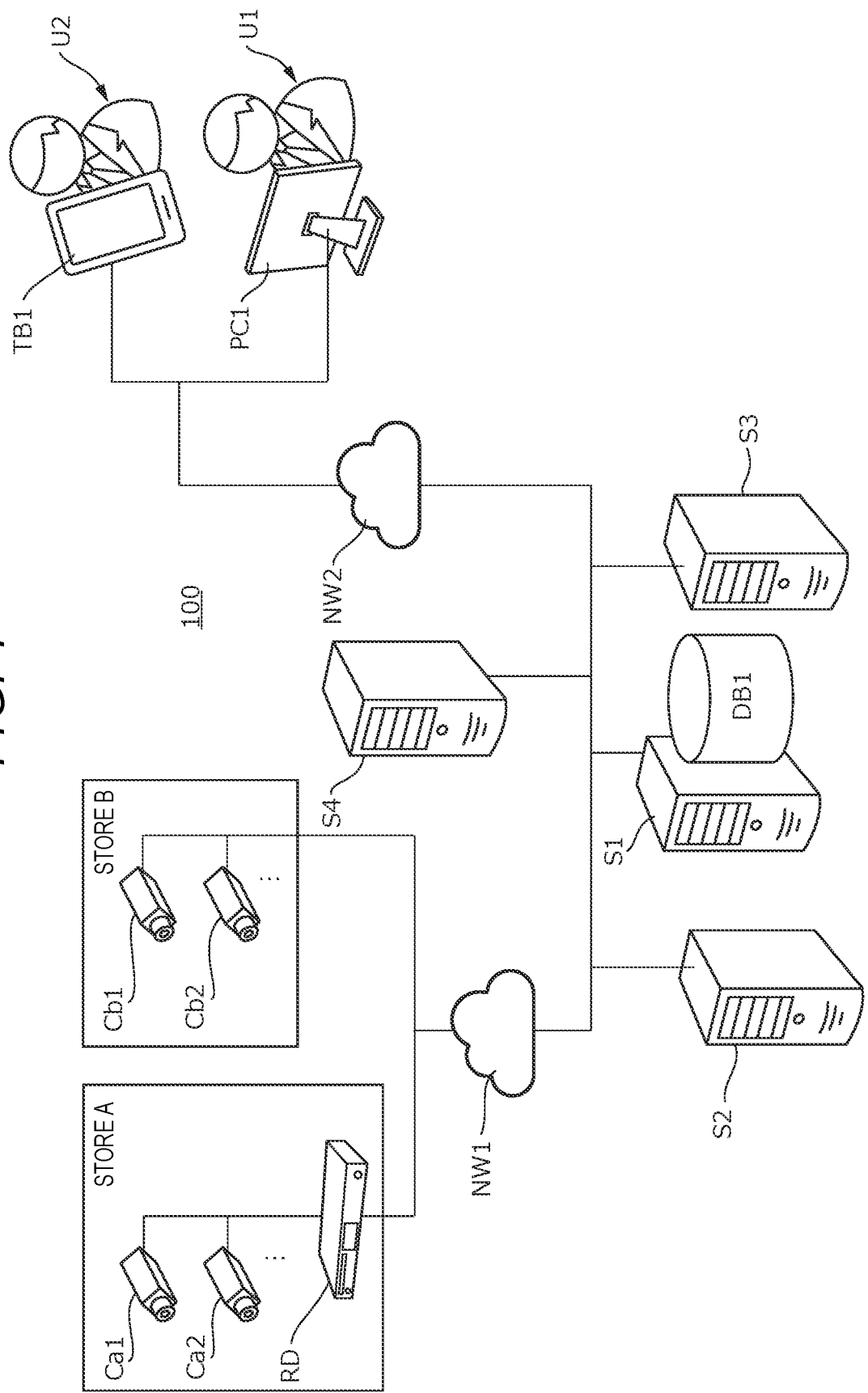
FIG. 1 is a diagram showing a system configuration example of a monitoring camera system.

FIG. 1 is a diagram showing a system configuration example of a monitoring camera system 100. As shown in FIG. 1, the monitoring camera system 100 (an example of a monitoring camera video sharing system) includes at least a client terminal PC1 (an example of a first user terminal), a DB server S1 (an example of a server), a device management server S2 (an example of the server), and a user management server S3 (an example of the server). The DB server S1, the device management server S2, and the user management server S3 are not necessarily required individually, and one or more servers having functions of the respective servers may be included.

The monitoring camera system 100 may further include a mobile terminal TB1 (an example of a second user terminal) and a distribution control server S4. Each of the client terminal PC1 and the mobile terminal TB1 is connected to each of the DB server S1, the device management server S2, the user management server S3, and the distribution control server S4 via a network NW2 so that data communication can be performed therebetween.

The monitoring camera system 100 may further include monitoring cameras Ca1, Ca2, . . . , and a recorder RD which are disposed in a target facility (for example, a store A), and monitoring cameras Cb1, Cb2, . . . which are disposed in a target facility (for example, a store B). Each of the monitoring cameras Ca1, Ca2, . . . , the recorder RD, and the monitoring cameras Cb1 and Cb2 is connected to the distribution control server S4 via a network NW1 so that data communication can be performed therebetween.

Each of the networks NW1 and NW2 is, for example, a wireless network conforming to any one of a wireless local area network (LAN) such as Wi-Fi (registered trademark), a cellular mobile communication scheme such as 4G or 5G, Bluetooth (registered trademark), and Wireless Gigabit (Wi-Gig), but may not be limited thereto. Each of the networks NW1 and NW2 may be a wired network such as a universal serial bus (USB) cable or a wired LAN. In the following description, video data captured by each of the monitoring cameras Ca1, Ca2, Cb1, Cb2, . . . includes not only the video data but also identification information of the monitoring camera that captures the video data and imaging date and time information.

The monitoring camera system 100 enables remote viewing (for example, viewing and listening to or playing back. The same shall apply hereinafter.) of the video data from at least one of the client terminal PC1 and the mobile terminal TB1 for monitoring purposes, and the video data is captured by each of the monitoring cameras Ca1 and Ca2 which are disposed in the target facility (for example, the store A). Similarly, the monitoring camera system 100 enables remote viewing of the video data from at least one of the client terminal PC1 and the mobile terminal TB1 for monitoring purposes, and the video data is captured by each of the monitoring cameras Cb1 and Cb2 disposed in the target facility (for example, the store B). An example of the target facility includes a store, but a facility (for example, a shopping mall and an office building) other than the store, or a plurality of stores may be regarded as one facility.

Further, when a sharing operation of favorite data (an example of access permission data) of a monitoring camera to another user (for example, a user U2) is performed by the client terminal PC1 used by a user U1, the monitoring camera system 100 executes sharing processing of performing setting based on the sharing operation such that the mobile terminal TB1 designated in the sharing operation can access video data of the monitoring camera specified by the favorite data. Details of the sharing processing will be described later with reference to FIG. 3 and subsequent accompanying drawings.

Each of the monitoring cameras Ca1, Ca2, . . . is disposed so as to be able to capture an image of an area to be monitored in the store A, and captures video data in which a subject (for example, a person existing in the store A, or an area to be focused on in the store A) is imaged. The captured video data may be recorded in a memory (not illustrated) in each of the monitoring cameras Ca1, Ca2, . . . , and may be transmitted to and stored in the recorder RD or directly transmitted to the distribution control server S4 via the network NW1. The subject may be an element other than the person and the area described above, and the same shall apply hereinafter.

The recorder RD may include a storage (not illustrated), receive, from each of the monitoring cameras Ca1, Ca2, . . . , the video data of the subject captured by a respective one of the monitoring cameras Ca1, Ca2, . . .

which are disposed in the store A so as to store the video data in the storage (see the above description), and intermittently or periodically transmit the video data to the distribution control server S4.

Each of the monitoring cameras Cb1, Cb2, . . . is disposed so as to be able to capture an image of an area to be monitored in the store B, and captures video data in which a subject (for example, a person existing in the store B, or an area to be focused on in the store B) is imaged. The captured video data may be recorded in a memory (not illustrated) in each of the monitoring cameras Cb1, Cb2, . . . , and may be directly transmitted to the distribution control server S4 via the network NW1. In order to simplify illustration in FIG. 1, a configuration in which the store B does not include the recorder RD is illustrated, but the store B may include the recorder RD.

The client terminal PC1 is, for example, a personal computer, and is used by the user U1. The client terminal PC1 performs data communication with each of the DB server S1, the device management server S2, the user management server S3, and the distribution control server S4 via the network NW2. In the following description, the user U1 is a person who performs the sharing operation of the favorite data of the monitoring camera, and is a person who has an access right to the video data of the monitoring camera specified by the favorite data. The client terminal PC1 transmits a request for the sharing processing of the favorite data of the monitoring camera to the device management server S2 or the user management server S3 by an operation performed by the user U1.

The mobile terminal TB1 is, for example, a mobile phone, a smartphone, or a tablet terminal, and is used by the user U2. The mobile terminal TB1 performs data communication with each of the DB server S1, the device management server S2, the user management server S3, and the distribution control server S4 via the network NW2. In the following description, the user U2 is a person for whom the sharing operation of the favorite data of the monitoring camera is performed, and is a person who can have, only by the sharing operation performed by the user U1, the access right to the video data of the monitoring camera specified by the favorite data of the user U1. The mobile terminal TB1 can access, by the sharing processing (see later description) based on the operation performed by the user U1, the video data of the monitoring camera specified by the favorite data of the monitoring camera.

Figure 2:
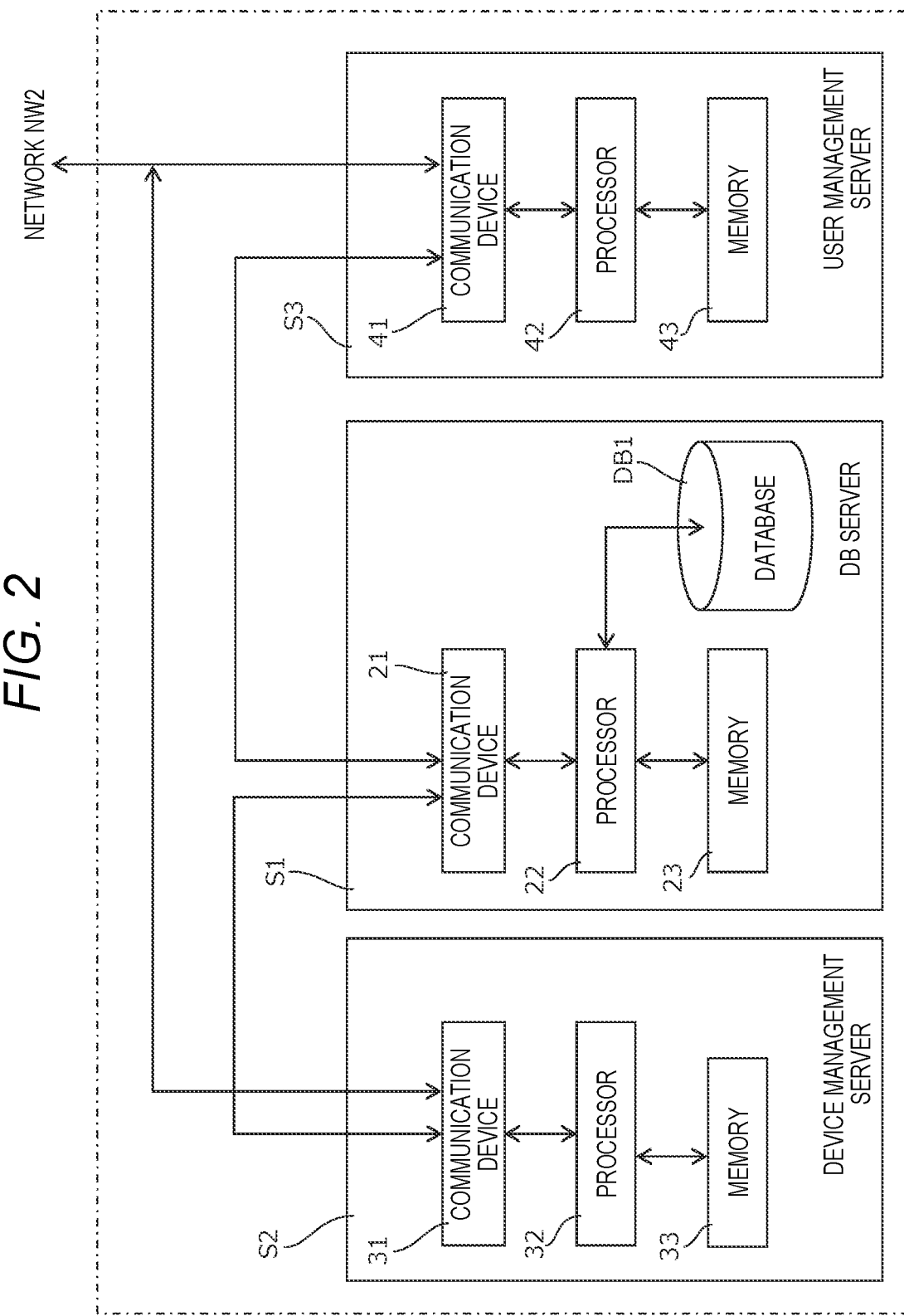
FIG. 2 is a block diagram showing hardware configuration examples of a device management server, a DB server, and a user management server.

The DB server S1 is implemented by, for example, a server computer, and includes a database DB that stores data of various types of setting information for each device (for example, a monitoring camera and a recorder) to be monitored by the monitoring camera system 100, and data of various types of setting information for each user who is registered to be able to use the monitoring camera system 100 (see FIG. 2). The DB server S1 refers to the database DB, and responds with data in response to a request from the device management server S2 or the user management server S3. The various types of setting information for each device are, for example, a name and an identification number of the device, a date and time when disposition (in other words, attachment) in the target facility is completed, a name of the target facility (for example, the store A) in which the device is disposed, and information of a license (for example, a license expiration date) indicating a use right for remote viewing or the like, but may not be limited thereto. The various types of setting information for each user are, for example, a name of the user, a login identification (ID) and a password which are required to be input when the user uses (in other words, logs into) the monitoring camera system 100, an expiration date of the login ID and the password, and a right of the user (for example, a right of a store manager having the same right as that of a responsible person, a right of a store clerk having the same right as that of a general user, or an access right to video data of a monitoring camera which is provided for each monitoring camera), but may not be limited thereto. A detailed hardware configuration example of the DB server S1 will be described later with reference to FIG. 2.

The device management server S2 is implemented by, for example, a server computer, and executes processing of handling the various types of setting information for each device to be monitored by the monitoring camera system 100 or favorite data by data communication with the DB server S1. For example, when the device management server S2 receives the favorite data (see later description) from the client terminal PC1 or the mobile terminal TB1, the device management server S2 adds the favorite data to the DB server S1, or instructs the DB server S1 to change (for example, add, change, or delete) data of setting information of the monitoring camera linked to (in other words, corresponding to) the favorite data (hereinafter, referred to as "favorite linked camera data"). The DB server S1 changes the corresponding favorite linked camera data based on the instruction. Further, the device management server S2 requests the DB server S1 to update the favorite linked camera data, based on an operation of the client terminal PC1 or the mobile terminal TB1. Further, the device management server S2 requests and acquires camera data specified by the favorite linked camera data (that is, the data of the setting information of the monitoring camera linked to the favorite data) from the DB server S1 based on an operation of the client terminal PC1 or the mobile terminal TB1. A detailed hardware configuration example of the device management server S2 will be described later with reference to FIG. 2.

The user management server S3 is implemented by, for example, a server computer, and executes processing of handling the various types of setting information for each user who is registered to be able to use the monitoring camera system 100 or favorite data by data communication with the DB server S1. For example, when the user management server S3 receives, from the client terminal PC1 or the mobile terminal TB1, a request for a change (for example, addition, change, or deletion) of data of setting information of a user who can access the favorite data (see later description) (hereinafter, referred to as "favorite access user data"), the user management server S3 instructs the DB server S1 to change the favorite access user data, based on the request. The DB server S1 changes the corresponding favorite access user data based on the instruction. When the user management server S3 receives a request for a change (for example, addition, change, or deletion) of data of setting information of a user who can access a monitoring camera (hereinafter, referred to as "camera access user data") linked to the favorite data, the user management server S3 instructs the DB server S1 to change the camera access user data, based on the request. The DB server S1 changes the corresponding camera access user data based on the instruction. Similarly to the device management server S2, when the user management server S3 receives the favorite data (see later description) from the client terminal PC1 or the mobile terminal TB1, the user management server S3 may add the favorite data to the DB server S1. A detailed hardware configuration example of the user management server S3 will be described later with reference to FIG. 2.

The distribution control server S4 is implemented by, for example, a server computer, acquires, from the DB server S1, information of a license of each device (for example, the monitoring camera and the recorder) to be monitored by the monitoring camera system 100 so as to refer to the information, and determines whether viewing on the client terminal PC1 or the mobile terminal TB1 is permitted. When it is determined that the license of the device (for example, the monitoring camera Ca1) to be determined is valid (that is, before a license expiration date elapses), the distribution control server S4 determines that the viewing, on the client terminal PC1 or the mobile terminal TB1, of the video data captured by the monitoring camera Ca1 is permitted. On the other hand, when it is determined that the license of the device (for example, the monitoring camera Ca1) to be determined is invalid (that is, after the license expiration date elapses) and the license is not updated, the distribution control server S4 determines that viewing, on the client terminal PC1 or the mobile terminal TB1, of the video data captured by the monitoring camera Ca1 is prohibited.

Hardware Configuration Example

FIG. 2 is a block diagram showing the hardware configuration examples of the device management server S2, the DB server S1, and the user management server S3. Except that the DB server S1 includes a database DB1, the device management server S2, the DB server S1, and the user management server S3 have the same hardware configuration. Instead of providing the DB server S1, each of other servers (that is, the device management server S2 and the user management server S3) may hold the database DB1, and may have a function and data for managing the held database DB1. The device management server S2, the DB server S1, and the user management server S3 are connected to each other by using, for example, a wired network such as a wired LAN, so as to enable data communication with each other.

The DB server S1 includes a communication device 21, a processor 22, a memory 23, and the database DB1. In the accompanying drawings, an interface is simply referred to as "IF" for convenience.

The communication device 21 performs data communication (that is, transmission and reception of data) with the device management server S2 or the user management server S3 connected via the above wired network (for example, the wired LAN) or the like. When the communication device 21 receives a request from the device management server S2 or the user management server S3, the communication device 21 returns an acknowledge (hereinafter, abbreviated as "Ack") that the processor 22 has executed to the device management server S2 or the user management server S3 based on the request. Processing of storing or reading data may be directly executed between the communication device 21 and the memory 23 without via the processor 22.

The processor 22 is implemented by, for example, a central processing unit (CPU), a digital signal processor (DSP), a graphical processing unit (GPU), or a field programmable gate array (FPGA). The processor 22 functions as a controller that controls an overall operation of the DB server S1, and performs control processing of controlling an operation of each unit of the DB server S1, input and output processing of data to and from each unit of the DB server S1, calculation processing of data, and storage processing of data. The processor 22 operates in accordance with a program and data stored in the memory 23. The processor 22 uses the memory 23 during an operation to temporarily store, in the memory 23, data or information (including Ack) created or acquired by the processor 22, or transmits the data or the information to the communication device 21. A specific example of processing performed by the processor 22 will be described with reference to FIG. 3 and the subsequent accompanying drawings.

The memory 23 is implemented by, for example, a random access memory (RAM) and a read only memory (ROM), and temporarily stores a program necessary for executing an operation of the DB server S1, and data or information created during the operation. The RAM is a work memory used during the operation of the DB server S1. The ROM stores and saves a program and data for controlling the DB server S1 in advance.

The database DB1 is implemented by a storage medium (for example, a flash memory, a hard disk drive (HDD), or a solid state drive (SSD)). The database DB1 stores the data of the various types of setting information for each device (for example, the monitoring camera and the recorder) to be monitored by the monitoring camera system 100 (see the above description), the data of the various types of setting information for each user who is registered to be able to use the monitoring camera system 100 (see the above description), and various types of data related to the favorite data.

The various types of data related to the favorite data are, for example, the favorite data, the favorite linked camera data, the favorite access user data, and the camera access user data.

The favorite data is data including at least one of the favorite linked camera data, the favorite access user data, and the camera access user data. More specifically, the favorite data is data that includes setting information of the target facility (for example, the store) selected as a remote monitoring target by a user of the monitoring camera system 100 (in other words, the user who can access the favorite data), the setting information of the device (for example, the monitoring camera) disposed in the target facility (see the above description), and the setting information of the user who can access the favorite data (see the above description).

The favorite linked camera data is data constituting the favorite data, and is the data of the setting information of the monitoring camera (see the above description) to be viewed for monitoring by access to the favorite data. For example, when the user U1 creates the favorite data such that the favorite data includes setting information of each of the monitoring cameras Ca1 and Ca2 in the store A (see FIG. 3), the favorite linked camera data constituting the favorite data is the setting information (for example, a name) of each of the monitoring cameras Ca1 and Ca2.

The favorite access user data is data constituting the favorite data, and is the data of the setting information of the user who can access the favorite data (see the above description). For example, when the user U1 creates the favorite data so as to be able to access the favorite data (see step St1 in FIG. 3), the favorite access user data constituting the favorite data is setting information (for example, a name) of the user U1. Further, when the user U1 performs the sharing operation of the favorite data so that the user U2 can also access the favorite data (see step St2 in FIG. 3), the favorite access user data constituting the favorite data is setting information (for example, a name) of each of the users U1 and U2.

The camera access user data is data constituting the favorite data, and is the data of the setting information of the user who can access the video data of the monitoring camera specified by the favorite linked camera data (see the above description). For example, when the user U1 performs an operation such that the user U2 can newly access the video data of the monitoring camera specified by the favorite linked camera data (see step St2 in FIG. 3), the DB server S1 creates the camera access user data including the setting information of the monitoring camera and the setting information of the new user U2.

The device management server S2 includes a communication device 31, a processor 32, and a memory 33.

The communication device 31 performs data communication (that is, transmission and reception of data) with the DB server S1 connected via the above wired network (for example, the wired LAN) or the like. The communication device 31 performs data communication with the client terminal PC1 or the mobile terminal TB1 connected via the network NW2. When the communication device 31 receives a request from the client terminal PC1 or the mobile terminal TB1, the communication device 31 returns an acknowledge (Ack) that the processor 32 has executed with the DB server S1 to the client terminal PC1 or the mobile terminal TB1 based on the request. Processing of storing or reading data may be directly executed between the communication device 31 and the memory 33 without via the processor 32.

The processor 32 is implemented by, for example, a CPU, a DSP, a GPU, or an FPGA. The processor 32 functions as a controller that controls an overall operation of the device management server S2, and performs control processing of controlling an operation of each unit of the device management server S2, input and output processing of data to and from each unit of the device management server S2, calculation processing of data, and storage processing of data. The processor 32 operates in accordance with a program and data stored in the memory 33. The processor 32 uses the memory 33 during an operation to temporarily store, in the memory 33, data or information (including Ack) created or acquired by the processor 32, or transmits the data or the information to the communication device 31. A specific example of processing performed by the processor 32 will be described with reference to FIG. 3 and the subsequent accompanying drawings.

The memory 33 is implemented by, for example, a RAM and a ROM, and temporarily stores a program necessary for executing an operation of the device management server S2, and data or information created during the operation. The RAM is a work memory used during the operation of the device management server S2. The ROM stores and saves a program and data for controlling the device management server S2 in advance.

The user management server S3 includes a communication device 41, a processor 42, and a memory 43.

The communication device 41 performs data communication (that is, transmission and reception of data) with the DB server S1 connected via the above wired network (for example, the wired LAN) or the like. The communication device 41 performs data communication with the client terminal PC1 or the mobile terminal TB1 connected via the network NW2. When the communication device 41 receives a request from the client terminal PC1 or the mobile terminal TB1, the communication device 41 returns an acknowledge (Ack) that the processor 42 has executed with the DB server S1 to the client terminal PC1 or the mobile terminal TB1 based on the request. Processing of storing or reading data may be directly executed between the communication device 41 and the memory 43 without via the processor 42.

The processor 42 is implemented by, for example, a CPU, a DSP, a GPU, or an FPGA. The processor 42 functions as a controller that controls an overall operation of the user management server S3, and performs control processing of controlling an operation of each unit of the user management server S3, input and output processing of data to and from each unit of the user management server S3, calculation processing of data, and storage processing of data. The processor 42 operates in accordance with a program and data stored in the memory 43. The processor 42 uses the memory 43 during an operation to temporarily store, in the memory 43, data or information (including Ack) created or acquired by the processor 42, or transmits the data or the information to the communication device 41. A specific example of processing performed by the processor 42 will be described with reference to FIG. 3 and the subsequent accompanying drawings.

The memory 43 is implemented by, for example, a RAM and a ROM, and temporarily stores a program necessary for executing an operation of the user management server S3, and data or information created during the operation. The RAM is a work memory used during the operation of the user management server S3. The ROM stores and saves a program and data for controlling the user management server S3 in advance.

First Operation Example

Figure 3:
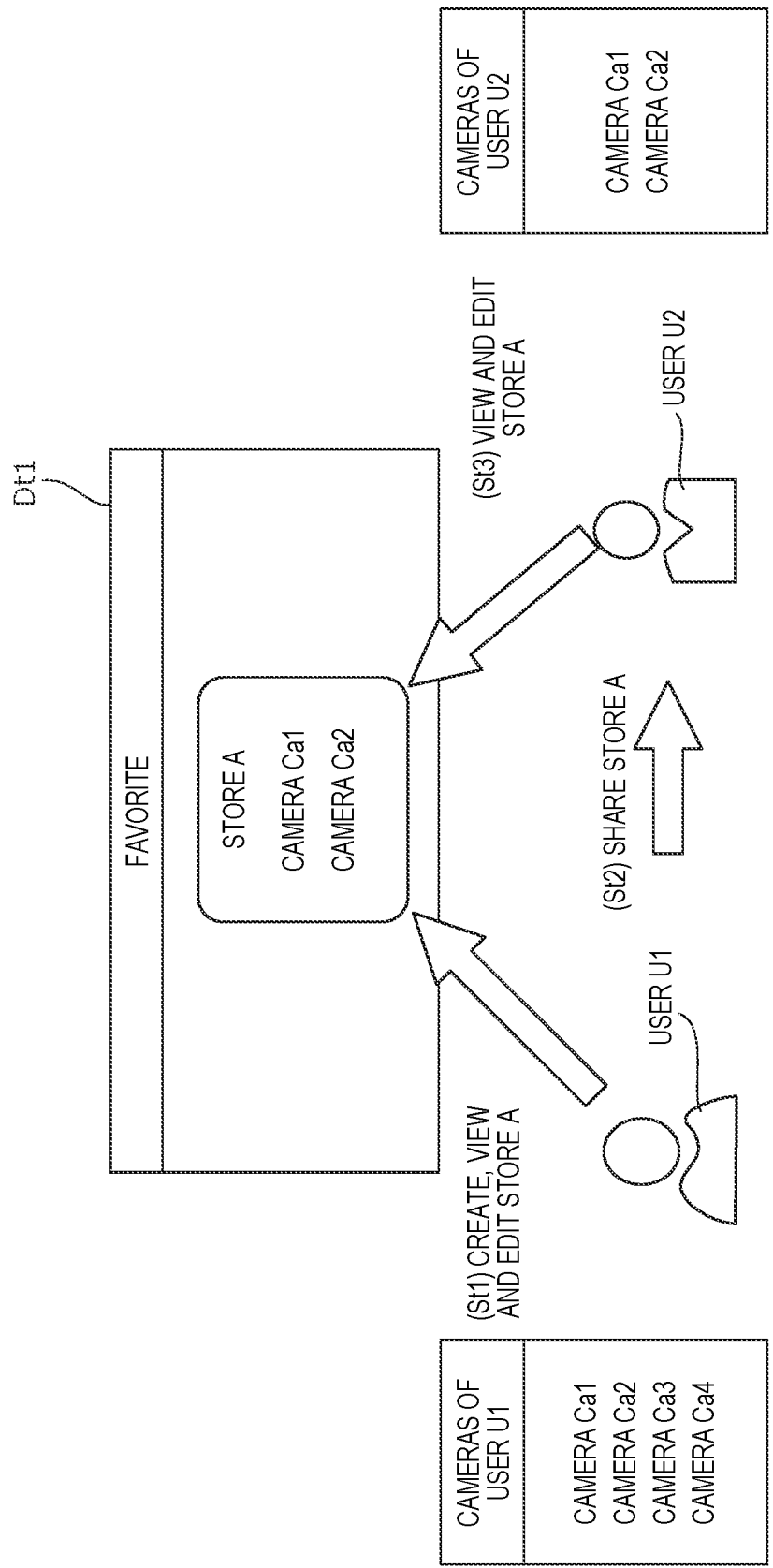
FIG. 3 is a diagram showing an operation outline according to a first operation example.

Next, an outline of a first operation example of sharing processing of favorite data of the monitoring camera system 100 according to a first embodiment will be described with reference to FIG. 3. FIG. 3 is a diagram showing an operation outline according to the first operation example. In the first operation example, favorite data Dt1 is data common to the users U1 and U2 of the monitoring camera system 100, and is not provided separately for each user.

As shown in FIG. 3, an example will be described in which, for example, the user U1 is registered in advance as a user of the monitoring camera system 100, and the user U2 newly registered as a user of the monitoring camera system 100 is set to be able to access the monitoring cameras Ca1 and Ca2 in the store A linked to the favorite data Dt1 created by the user U1.

(St1) The user U1 is set to be able to remotely view video data of each of monitoring cameras (for example, four monitoring cameras Ca1, Ca2, Ca3, and Ca4) disposed in the store A. That is, setting information (for example, a right) of the user U1 includes a right to access the video data of each of the monitoring cameras Ca1, Ca2, Ca3, and Ca4 disposed in the store A, the client terminal PC1 used by the user U1 is an example of a user terminal which is permitted to log into the monitoring camera system 100 as the user U1 by the setting information (for example, a login ID and a password) of the user U1, and the same shall apply hereinafter. The client terminal PC1 creates, by an operation performed by the user U1, the favorite data Dt1 including data of the setting information of each of the monitoring cameras Ca1 and Ca2 in the store A. The favorite data Dt1 is data that acts as a right to access the video data of each of the monitoring cameras Ca1 and Ca2 (an example of a selected monitoring camera) in the store A selected by the user U1. Creation of the favorite data Dt1 has been described here, and the client terminal PC1 can also edit or delete the favorite data Dt1 by an operation performed by the user U1.

(St2) The client terminal PC1 executes, by the sharing operation performed by the user U1, the sharing processing of sharing the favorite data Dt1 created in step St1 to the user U2. The mobile terminal TB1 used by the user U2 is an example which is permitted to log into the monitoring camera system 100 as the user U2 by setting information (for example, a login ID and a password) of the user U2, and the same shall apply hereinafter. As a result, the mobile terminal TB1 used by the user U2 can acquire the favorite data Dt1, can access the video data of each of the monitoring cameras Ca1 and Ca2 in the store A specified by the favorite data Dt1, and enables remote viewing.

(St3) The user U2 is set to be able to remotely view the video data of each of the monitoring cameras Ca1 and Ca2 disposed in the store A by sharing the favorite data Dt1. The mobile terminal TB1 which is used by the user U2 (that is, which is permitted to log in as the user U2 based on the setting information of the user U2) can edit or delete the favorite data Dt1 by an operation performed by the user U2.

Figure 4:
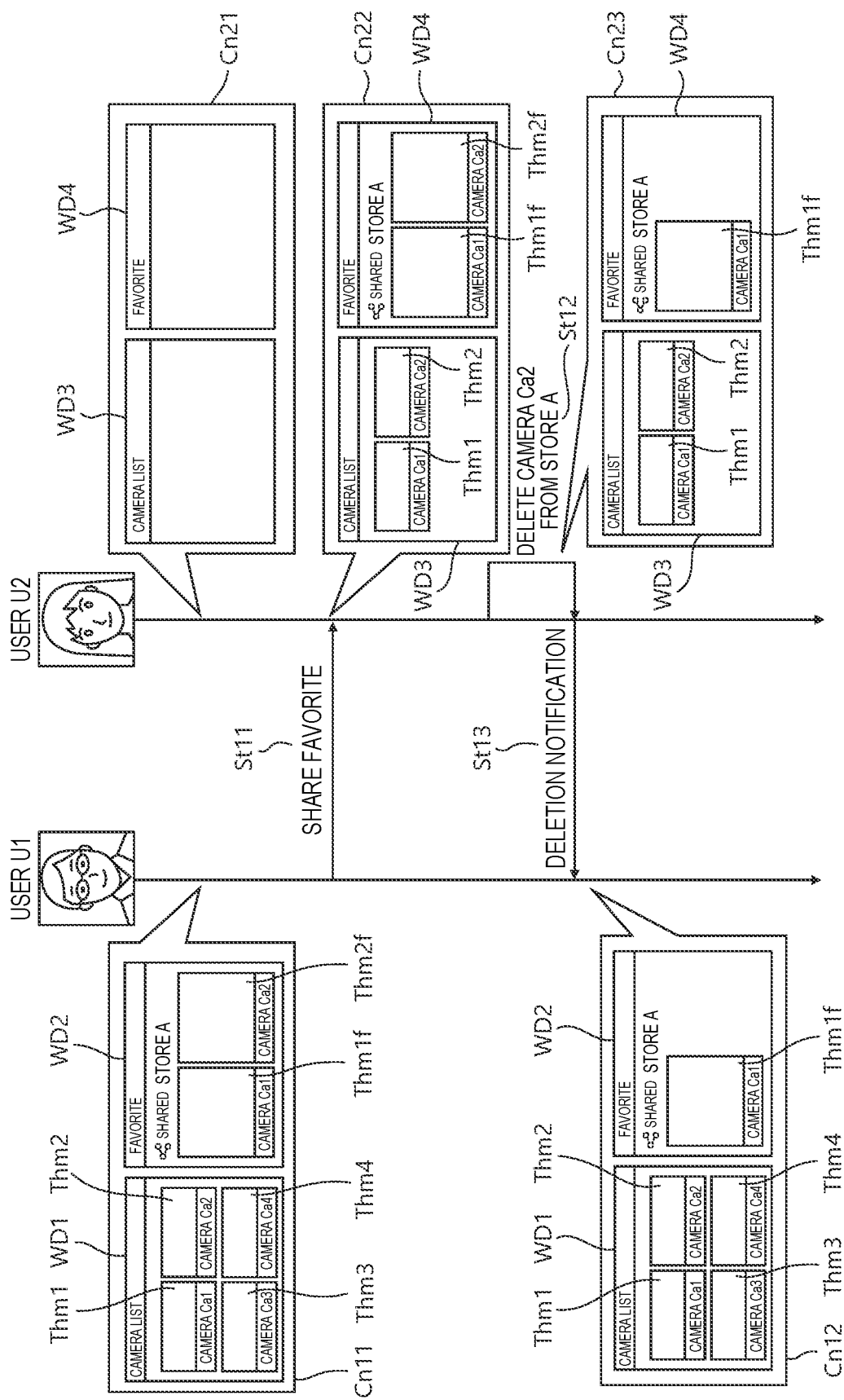
FIG. 4 is a diagram showing an example of transition of a screen displayed on a terminal of each of users U1 and U2 according to the first operation example.

FIG. 4 is a diagram showing an example of transition of a screen displayed on a terminal of each of the users U1 and U2 according to the first operation example. In FIG. 4, the monitoring camera is simply abbreviated as a camera.

In an initial state Cn11 of the client terminal PC1 corresponding to step St1 in FIG. 3, the client terminal PC1 which is used by the user U1 (that is, which is permitted to log in as the user U1 based on the setting information of the user U1) displays, on a camera list screen WD1, thumbnails Thm1, Thm2, Thm3, and Thm4 each indicating that the video data of a respective one of the monitoring cameras Ca1, Ca2, Ca3, and Ca4 disposed in the store A can be remotely viewed. Further, in response to the creation of the favorite data Dt1, the client terminal PC1 displays, on a favorite screen WD2, thumbnails Thm1f and Thm2f each indicating contents of the favorite data Dt1 (for example, indicating that the video data of a respective one of the monitoring cameras Ca1 and Ca2 disposed in the store A can be remotely viewed).

On the other hand, in an initial state Cn21 of the mobile terminal TB1 corresponding to step St1 in FIG. 3, since it is before the sharing processing of the favorite data Dt1 is executed and no monitoring camera accessible by the mobile terminal TB1 is set, the mobile terminal TB1 which is used by the user U2 (that is, which is permitted to log in as the user U2 based on the setting information of the user U2) displays a camera list screen WD3 and a favorite screen WD4 on each of which no thumbnail of a monitoring camera is displayed.

For example, it is assumed that correspondingly to step St2 in FIG. 3, the user U1 performs the sharing operation of sharing the favorite data Dt1 to the user U2 (St11).

In a state Cn22 of the mobile terminal TB1, the mobile terminal TB1 can access the favorite data Dt1 (in other words, access the video data of each of the monitoring cameras Ca1 and Ca2 disposed in the store A) by the sharing processing (see FIG. 6) based on the sharing operation of the favorite data Dt1 in step St11. Therefore, the mobile terminal TB1 displays and updates, on the camera list screen WD3, the thumbnails Thm1 and Thm2 each indicating that the video data of a respective one of the monitoring cameras Ca1 and Ca2 disposed in the store A can be remotely viewed. Further, the mobile terminal TB1 displays and updates, on the favorite screen WD4, the thumbnails Thm1f and Thm2f each indicating the contents of the favorite data Dt1 (for example, indicating that the video data of a respective one of the monitoring cameras Ca1 and Ca2 disposed in the store A can be remotely viewed).

For example, it is assumed that correspondingly to step St3 in FIG. 3, the user U2 performs an editing operation of the favorite data Dt1 (for example, a deletion operation of the monitoring camera Ca2) (St12). Deletion of the monitoring camera Ca2 corresponds to, for example, deletion of data of the setting information of the monitoring camera Ca2 in the favorite linked camera data constituting the favorite data Dt1.

In a state Cn23 of the mobile terminal TB1, the mobile terminal TB1 deletes the thumbnail Thm2f on the favorite screen WD4 by the editing operation of the favorite data Dt1 in step St12, thereby displaying and updating the favorite screen WD4. By the displaying and updating, only the thumbnail Thm1f of the monitoring camera Ca1 is displayed on the favorite screen WD4. Further, the mobile terminal TB1 transmits, to the device management server S2, a notification (deletion notification) that the monitoring camera Ca2 in the favorite data Dt1 is deleted in step St12 (St13). When the device management server S2 receives the deletion notification, the device management server S2 transfers the deletion notification to the client terminal PC1, and transmits, to the DB server S1, an instruction to delete the data of the setting information of the monitoring camera Ca2 from the favorite linked camera data constituting the favorite data Dt1. The DB server S1 deletes, based on the instruction from the device management server S2, the data of the setting information of the monitoring camera Ca2 from the favorite linked camera data constituting the favorite data Dt1.

In a state Cn12 of the client terminal PC1, when the client terminal PC1 receives the deletion notification from the device management server S2, the client terminal PC1 displays and updates the favorite screen WD2 by deleting the thumbnail Thm2f on the favorite screen WD2 in the initial state Cn11.

Figure 5:
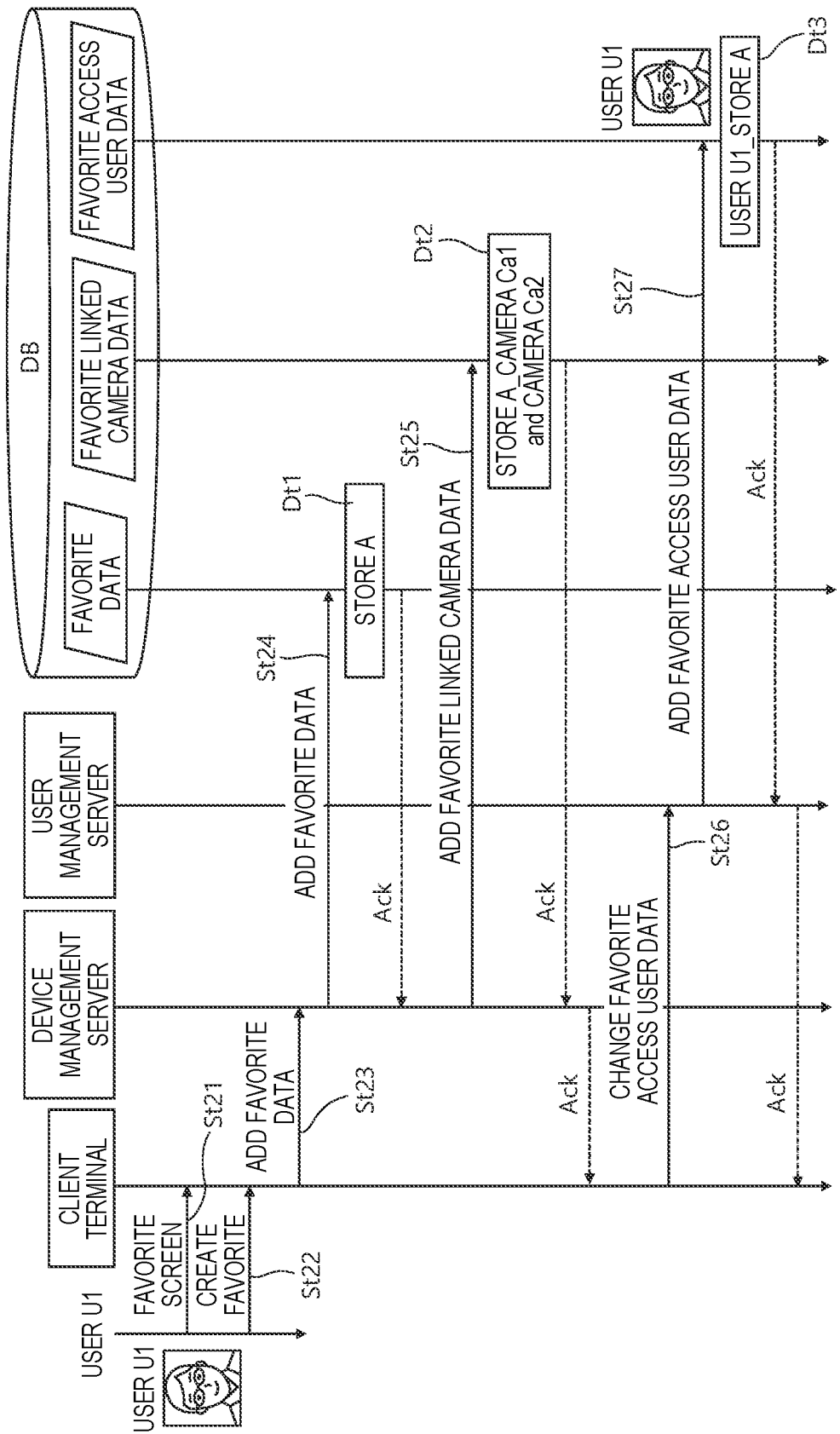
FIG. 5 is a sequence diagram showing, in time series, an operation procedure of creation processing of favorite data according to the first operation example.
Figure 6:
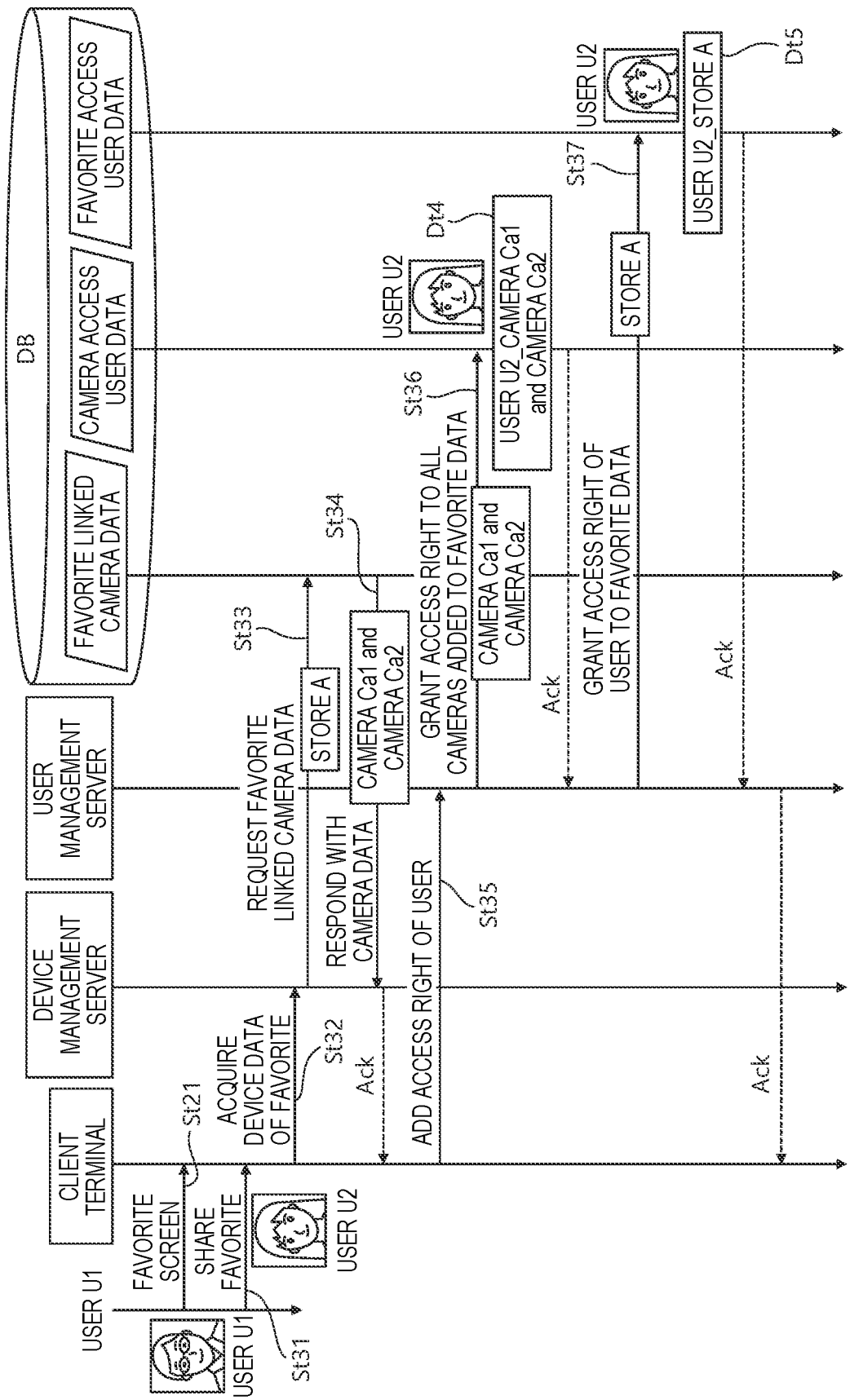
FIG. 6 is a sequence diagram showing, in time series, an operation procedure of sharing processing of the favorite data according to the first operation example.

FIG. 5 is a sequence diagram showing, in time series, an operation procedure of creation processing of the favorite data according to the first operation example. FIG. 6 is a sequence diagram showing, in time series, an operation procedure of the sharing processing of the favorite data according to the first operation example. In description of FIGS. 5 and 6, processing performed by each server is mainly executed by a processor included in the server. In the description of FIG. 6, the same processing as those in the description of FIG. 5 are denoted by the same step numbers, description thereof will be simplified or omitted, and different contents will be described.

In FIG. 5, by an operation performed by the user U1, the client terminal PC1 displays a favorite screen (St21), and selects the monitoring cameras Ca1 and Ca2 disposed in the store A so as to create the favorite data that acts as the right to access the video data of each of the selected monitoring cameras Ca1 and Ca2 (St22). The client terminal PC1 requests the device management server S2 to add the favorite data of the store A created in step St22 (St23). In accordance with the request in step St23, the device management server S2 instructs the DB server S1 to add the favorite data of the store A created in step St22 (St24). In accordance with the instruction, the DB server S1 adds the favorite data of the store A to the database DB1. Ack that addition of the favorite data of the store A to the database DB1 is completed is returned to the device management server S2.

Based on reception of the Ack from the DB server S1, the device management server S2 instructs the DB server S1 to add the data of the setting information of each of the monitoring cameras Ca1 and Ca2 to the favorite linked camera data constituting the favorite data of the store A (St25). In accordance with the instruction, the DB server S1 adds, to the database DB1, favorite linked camera data Dt2 to which the data of the setting information of each of the monitoring cameras Ca1 and Ca2 is added, in order to constitute (create) the favorite data of the store A. Ack that addition of the favorite linked camera data Dt2 to the database DB1 is completed is returned to the device management server S2 and the client terminal PC1.

Based on reception of the Ack from the DB server S1, the client terminal PC1 requests the user management server S3 to add data of the setting information of the user U1 to the favorite access user data constituting the favorite data of the store A (St26). In accordance with the request in step St26, the user management server S3 instructs the DB server S1 to add the data of the setting information of the user U1 to the favorite access user data constituting the favorite data of the store A (St27). In accordance with the instruction, the DB server S1 adds, to the database DB1, favorite access user data Dt3 to which the data of the setting information of the user U1 is added, in order to constitute the favorite data of the store A. Ack that addition of the favorite access user data Dt3 to the database DB1 is completed is returned to the user management server S3 and the client terminal PC1. As a result, the client terminal PC1 completes registration, in the database DB1, of the favorite data that acts as the right to access the video data of each of the monitoring cameras Ca1 and Ca2 disposed in the store A.

In FIG. 6, by the operation performed by the user U1, the client terminal PC1 executes the sharing operation on the favorite screen (see FIG. 5) displayed in step St21 (St31), and the sharing operation is to share, to the user U2, the favorite data that acts as the right to access the video data of each of the monitoring cameras Ca1 and Ca2 disposed in the store A. The client terminal PC1 requests the device management server S2 to acquire device data (that is, the data of the setting information of the device) linked to the favorite data which is a target of the sharing operation executed in step St31 (St32). In accordance with the request in step St32, the device management server S2 instructs the DB server S1 to request the favorite linked camera data constituting the favorite data which is the target of the sharing operation (St33). In accordance with the instruction, the DB server S1 returns, to the device management server S2, the favorite linked camera data (that is, the data of the setting information of each of the monitoring cameras Ca1 and Ca2) constituting the favorite data of the store A (St34). Ack that returning of the favorite linked camera data (that is, the data of the setting information of each of the monitoring cameras Ca1 and Ca2) constituting the favorite data of the store A is completed is returned to the client terminal PC1.

Based on reception of the Ack from the device management server S2, the client terminal PC1 requests the user management server S3 to add an access right of a user (specifically, the user U2) to the favorite data of the store A (St35). In accordance with the request in step St35, the user management server S3 instructs the DB server S1 to add data of the setting information of the user U2 to the camera access user data indicating that the user U2 has an access right to the video data of each of all the monitoring cameras Ca1 and Ca2 registered in the favorite data of the store A (St36). In accordance with the instruction, the DB server S1 adds, to the database DB1, camera access user data Dt4 to which the data of the setting information of the user U2 is added, in order to constitute the favorite data of the store A. Ack that addition of the camera access user data Dt4 to the database DB1 is completed is returned to the user management server S3, and the camera access user data Dt4 indicates that the user U2 has the right to access the video data of each of the monitoring cameras Ca1 and Ca2. Further, in response to reception of the Ack from the DB server S1, the user management server S3 instructs the DB server S1 to add the data of the setting information of the user U2 to the favorite access user data constituting the favorite data of the store A (St37). In accordance with the instruction, the DB server S1 adds, to the database DB1, favorite access user data Dt5 to which the data of the setting information of the user U2 is added, in order to constitute the favorite data of the store A. Ack that addition of the favorite access user data Dt5 to the database DB1 is completed is returned to the user management server S3 and the client terminal PC1. As a result, by the sharing operation performed by the client terminal PC1 which is used by the user U1 (that is, which is permitted to log in as the user U1 based on the setting information of the user U1), the mobile terminal TB1 which is used by the user U2 (that is, which is permitted to log in as the user U2 based on the setting information of the user U2) is set to be able to access the video data of each of the monitoring cameras Ca1 and Ca2 disposed in the store A, so that these pieces of video data can be viewed remotely.

Second Operation Example

Figure 7:
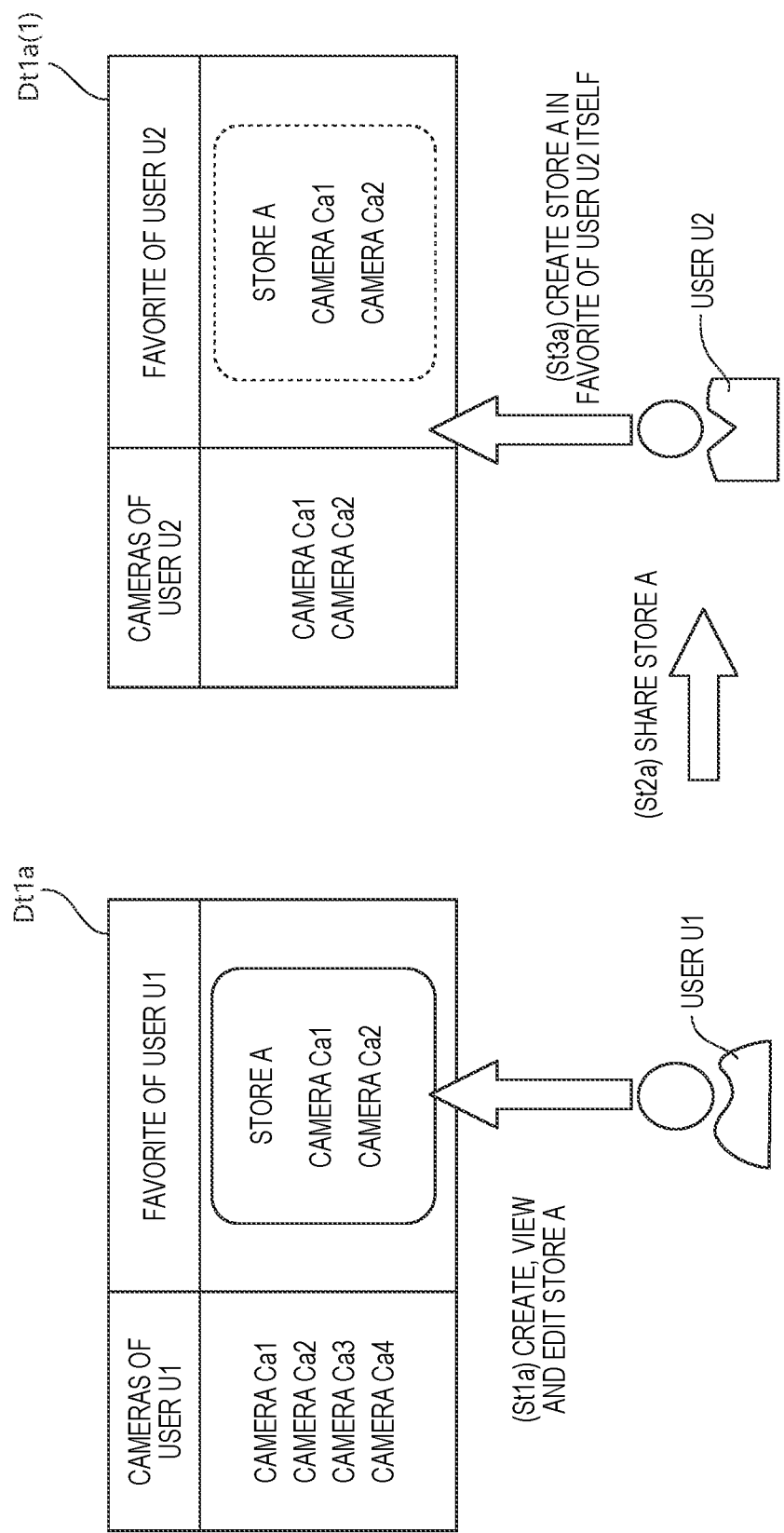
FIG. 7 is a diagram showing an operation outline according to a second operation example.

Next, an outline of a second operation example of sharing processing of favorite data of the monitoring camera system 100 according to the first embodiment will be described with reference to FIG. 7. FIG. 7 is a diagram showing an operation outline according to the second operation example. In the second operation example, favorite data Dt1a and Dt1a(1) are data which are created individually for the users U1 and U2 of the monitoring camera system 100, respectively.

As shown in FIG. 7, an example will be described in which, for example, the user U1 is registered in advance as the user of the monitoring camera system 100, and the user U2 newly registered as the user of the monitoring camera system 100 is set to be able to access the monitoring cameras Ca1 and Ca2 in the store A linked to the favorite data Dt1a created by the user U1.

(St1a) The user U1 is set to be able to remotely view the video data of each of the monitoring cameras (for example, the four monitoring cameras Ca1, Ca2, Ca3, and Ca4) disposed in the store A. The client terminal PC1 which is used by the user U1 (that is, which is permitted to log in as the user U1 based on the setting information of the user U1) creates, by an operation performed by the user U1, the favorite data Dt1a including the data of the setting information of each of the monitoring cameras Ca1 and Ca2 in the store A. The favorite data Dt1a is data that acts as a right to access the video data of each of the monitoring cameras Ca1 and Ca2 (the example of the selected monitoring camera) in the store A selected by the user U1. Creation of the favorite data Dt1a has been described here, and the client terminal PC1 can also edit or delete the favorite data Dt1a by an operation performed by the user U1.

(St2a) The client terminal PC1 executes, by the sharing operation performed by the user U1, the sharing processing of sharing the favorite data Dt1 a created in step St1a to the user U2. As a result, the mobile terminal TB1 which is used by the user U2 (that is, which is permitted to log in as the user U2 based on the setting information of the user U2) can acquire the favorite data Dt1a(1) that is data substantially the same as the favorite data Dt1a, can access the video data of each of the monitoring cameras Ca1 and Ca2 in the store A specified by the favorite data Dt1a(1), and enables remote viewing.

(St3a) The user U2 is set to be able to remotely view the video data of each of the monitoring cameras Ca1 and Ca2 disposed in the store A by acquiring the favorite data Dt1a(1). The mobile terminal TB1 which is used by the user U2 (that is, which is permitted to log in as the user U2 based on the setting information of the user U2) can independently edit or delete the favorite data Dt1a(1) regardless of the favorite data Dt1a of the user U1 by an operation performed by the user U2.

Figure 8:
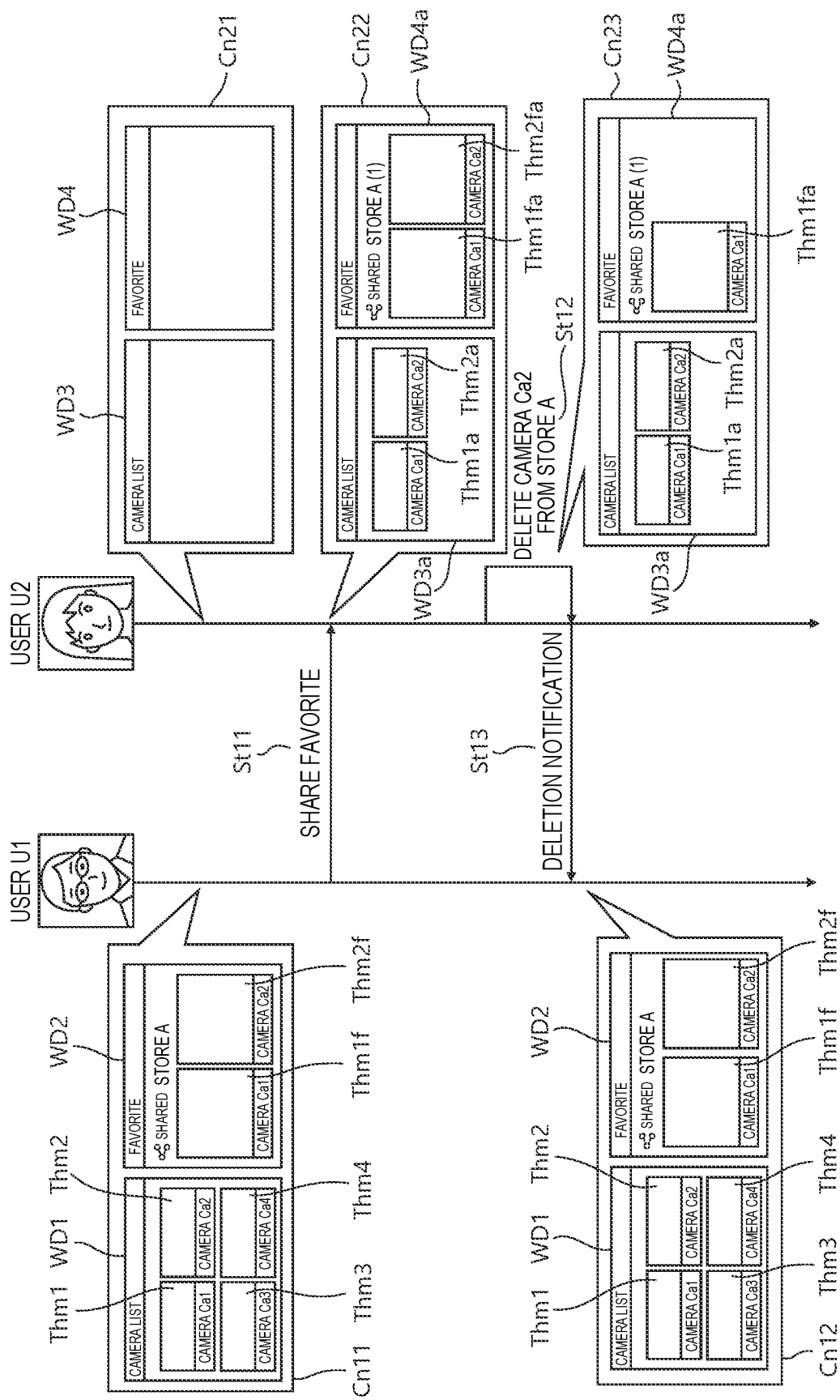
FIG. 8 is a diagram showing an example of transition of a screen displayed on the terminal of each of the users U1 and U2 according to the second operation example.

FIG. 8 is a diagram showing an example of transition of a screen displayed on the terminal of each of the users U1 and U2 according to the second operation example. In FIG. 8, the monitoring camera is simply abbreviated as the camera. In description of FIG. 8, the same elements as those in FIG. 4 are denoted by the same reference numerals, description thereof will be simplified or omitted, and different contents will be described.

In the initial state Cn11 of the client terminal PC1 corresponding to step St1a in FIG. 7, the client terminal PC1 which is used by the user U1 (that is, which is permitted to log in as the user U1 based on the setting information of the user U1) displays, on the camera list screen WD1, the thumbnails Thm1, Thm2, Thm3, and Thm4 each indicating that the video data of a respective one of the monitoring cameras Ca1, Ca2, Ca3, and Ca4 disposed in the store A can be remotely viewed. Further, in response to the creation of the favorite data Dt1a, the client terminal PC1 displays, on the favorite screen WD2, the thumbnails Thm1f and Thm2f each indicating contents of the favorite data Dt1a (for example, indicating that the video data of a respective one of the monitoring cameras Ca1 and Ca2 disposed in the store A can be remotely viewed).

On the other hand, in the initial state Cn21 of the mobile terminal TB1 corresponding to step St1a in FIG. 7, since it is before the sharing processing of the favorite data Dt1a is executed and no monitoring camera accessible by the mobile terminal TB1 is set, the mobile terminal TB1 which is used by the user U2 (that is, which is permitted to log in as the user U2 based on the setting information of the user U2) displays the camera list screen WD3 and the favorite screen WD4 on each of which no thumbnail of the monitoring camera is displayed.

For example, it is assumed that correspondingly to step St2a in FIG. 7, the user U1 performs the sharing operation of sharing the favorite data Dt1a to the user U2 (St11).

In the state Cn22 of the mobile terminal TB1, by the sharing processing (see FIG. 10) based on the sharing operation of the favorite data Dt1a in step St11, the mobile terminal TB1 acquires the favorite data Dt1a(1) that is the data substantially the same as the favorite data Dt1a, and can access the favorite data Dt1a(1) (in other words, access the video data of each of the monitoring cameras Ca1 and Ca2 disposed in the store A). Therefore, the mobile terminal TB1 displays and updates, on a camera list screen WD3a, thumbnails Thm1a and Thm2a each indicating that the video data of a respective one of the monitoring cameras Ca1 and Ca2 disposed in the store A can be remotely viewed. Further, the mobile terminal TB1 displays and updates, on a favorite screen WD4a, thumbnails Thm1fa and Thm2fa each indicating contents of the favorite data Dt1a(1) (for example, indicating that the video data of a respective one of the monitoring cameras Ca1 and Ca2 disposed in the store A can be remotely viewed).

For example, it is assumed that correspondingly to step St3a in FIG. 7, the user U2 performs an editing operation of the favorite data Dt1a(1) (for example, the deletion operation of the monitoring camera Ca2) (St12). Deletion of the monitoring camera Ca2 corresponds to, for example, deletion of the data of the setting information of the monitoring camera Ca2 in the favorite linked camera data constituting the favorite data Dt1a(1).

In the state Cn23 of the mobile terminal TB1, the mobile terminal TB1 deletes the thumbnail Thm2fa on the favorite screen WD4a by the editing operation of the favorite data Dt1a(1) in step St12, thereby displaying and updating the favorite screen WD4a. By the displaying and updating, only the thumbnail Thm1fa of the monitoring camera Ca1 is displayed on the favorite screen WD4a. Further, the mobile terminal TB1 transmits, to the device management server S2, a notification (deletion notification) that the monitoring camera Ca2 in the favorite data Dt1a(1) is deleted in step St12 (St13). When the device management server S2 receives the deletion notification, the device management server S2 transfers the deletion notification to the client terminal PC1, and transmits, to the DB server S1, an instruction to delete the data of the setting information of the monitoring camera Ca2 from the favorite linked camera data constituting the favorite data Dt1a(1). The DB server S1 deletes, based on the instruction from the device management server S2, the data of the setting information of the monitoring camera Ca2 from the favorite linked camera data constituting the favorite data Dt1a(1).

In the state Cn12 of the client terminal PC1, even when the client terminal PC1 receives the deletion notification from the device management server S2, the client terminal PC1 continues to display the same favorite screen WD2 as the favorite screen WD2 in the initial state Cn11 without updating display on the favorite screen WD2 in the initial state Cn11. It is because, in the second operation example as described above, the favorite data Dt1a of the user U1 and the favorite data Dt1a(1) of the user U2 are separately created so that editing of one favorite data does not affect contents of the other favorite data.

Figure 9:
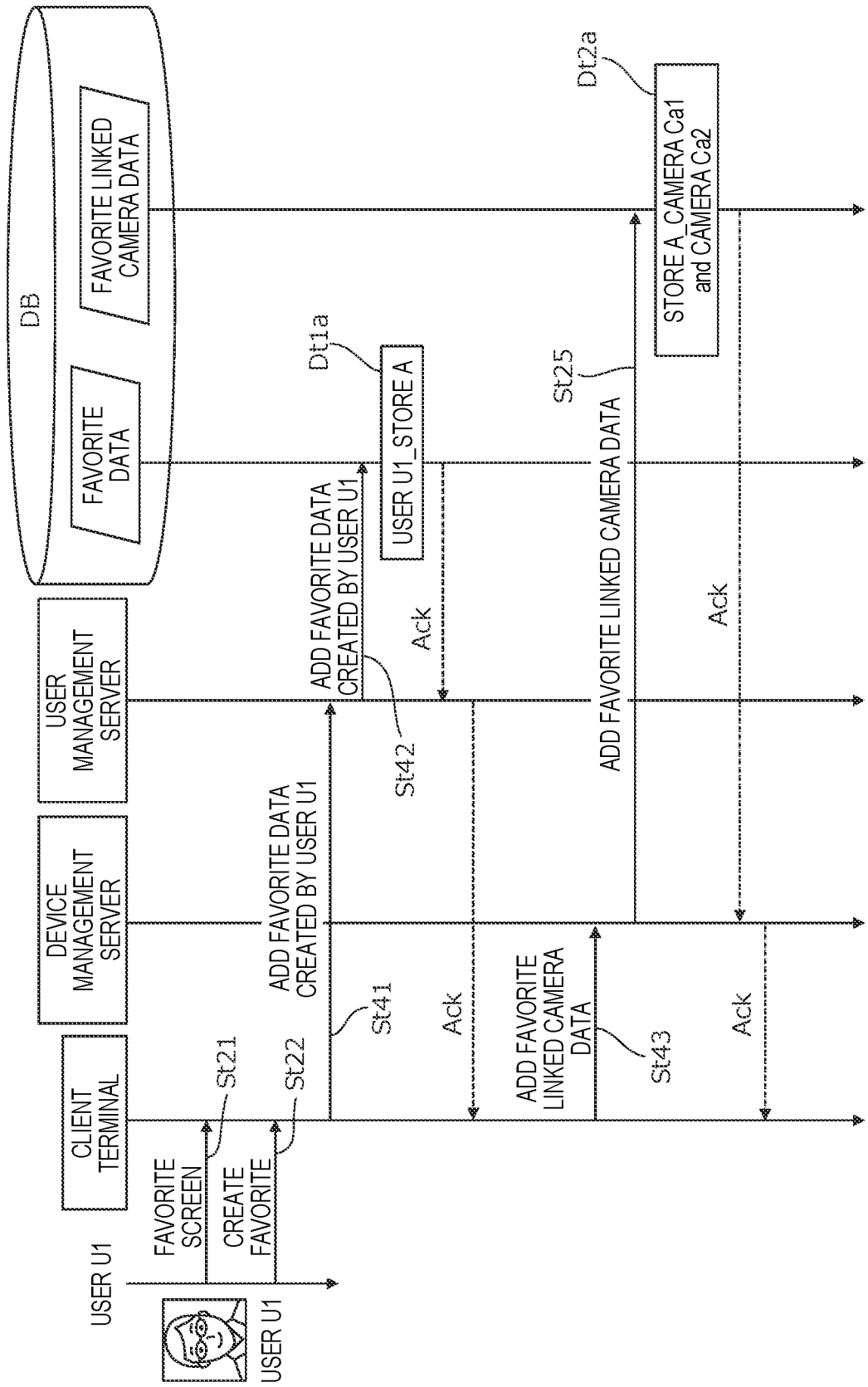
FIG. 9 is a sequence diagram showing, in time series, an operation procedure of creation processing of favorite data according to the second operation example.
Figure 10:
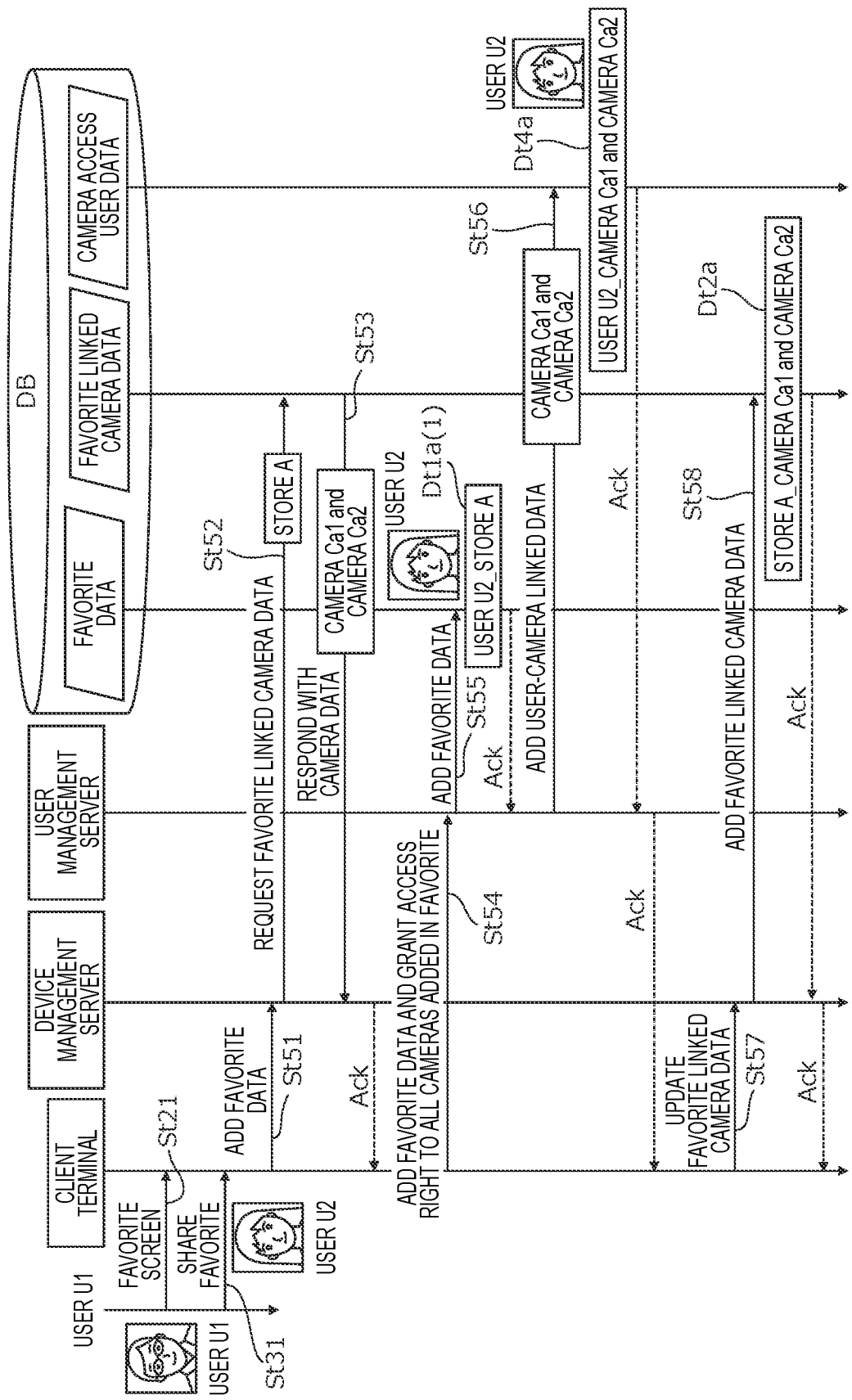
FIG. 10 is a sequence diagram showing, in time series, an operation procedure of sharing processing of the favorite data according to the second operation example.

FIG. 9 is a sequence diagram showing, in time series, an operation procedure of creation processing of the favorite data according to the second operation example. FIG. 10 is a sequence diagram showing, in time series, an operation procedure of the sharing processing of the favorite data according to the second operation example. In description of FIGS. 9 and 10, processing performed by each server is mainly executed by the processor included in the server. In the description of FIGS. 9 and 10, the same processing as those in the description of FIG. 5 are denoted by the same step numbers, description thereof will be simplified or omitted, and different contents will be described.

In FIG. 9, the client terminal PC1 requests the user management server S3 to add the favorite data of the store A created by the user U1 in step St22 (St41). In accordance with the request in step St41, the user management server S3 instructs the DB server S1 to add the favorite data of the store A created by the user U1 in step St22 (St42). In accordance with the instruction, the DB server S1 adds, to the database DB1, the favorite data Dt1a of the store A created by the user U1. Ack that addition of the favorite data of the store A created by the user U1 to the database DB1 is completed is returned to the user management server S3 and the client terminal PC1.

Based on reception of the Ack from the DB server S1, the client terminal PC1 requests the device management server S2 to add the favorite linked camera data constituting the favorite data of the store A created by the user U1 (St43). The request includes the data of the setting information of each of the monitoring cameras Ca1 and Ca2 specified by the favorite data Dt1a of the store A. In accordance with the request in step St43, the device management server S2 instructs the DB server S1 to add the data of the setting information of each of the monitoring cameras Ca1 and Ca2 to the favorite linked camera data constituting the favorite data of the store A created by the user U1 (St25). In accordance with the instruction, the DB server S1 adds, to the database DB1, favorite linked camera data Dt2a to which the data of the setting information of each of the monitoring cameras Ca1 and Ca2 included in the request in step St43 is added, in order to constitute (create) the favorite data of the store A. Ack that addition of the favorite linked camera data Dt2a to the database DB1 is completed is returned to the device management server S2 and the client terminal PC1. As a result, the client terminal PC1 completes registration, in the database DB1, of the favorite data of the user U1 that acts as the right to access the video data of each of the monitoring cameras Ca1 and Ca2 disposed in the store A.

In FIG. 10, the client terminal PC1 requests the device management server S2 to add favorite data that is data substantially the same as the favorite data which is created by the user U1 and which is the target of the sharing operation executed in step St31 (St51). The request includes data of various types of setting information constituting the favorite data Dt1a of the store A. In accordance with the request in step St51, the device management server S2 instructs the DB server S1 to request the favorite linked camera data constituting the favorite data which is created by the user U1 and which is a sharing source (St52). In accordance with the instruction, the DB server S1 returns, to the device management server S2, the favorite linked camera data (that is, the data of the setting information of each of the monitoring cameras Ca1 and Ca2) constituting the favorite data created by the user U1 (St53). Ack that returning of the favorite linked camera data (that is, the data of the setting information of each of the monitoring cameras Ca1 and Ca2) constituting the favorite data created by the user U1 is completed is returned to the client terminal PC1.

Based on reception of the Ack from the device management server S2, the client terminal PC1 requests the user management server S3 to add the favorite data of the store A created by the user U2, and to grant the access right to the video data of each of all the monitoring cameras Ca1 and Ca2 registered in the favorite data which is created by the user U1 and which is the sharing source (St54), and the favorite data of the store A is data substantially the same as the favorite data which is created by the user U1 and which is the sharing source. In accordance with the request in step St54, the user management server S3 instructs the DB server S1 to add the favorite data of the store A created by the user U2 (St55). In accordance with the instruction, the DB server S1 adds, to the database DB1, the favorite data Dt1a(1) of the store A created by the user U2. Ack that addition, to the database DB1, of the favorite data Dt1a(1) of the store A created by the user U2 is completed is returned from the DB server S1 to the user management server S3.

Based on reception of the Ack from the DB server S1, the user management server S3 instructs the DB server S1 to add the data of the setting information of the user U2 to the camera access user data (St56) in order to constitute the favorite data Dt1a(1) of the store A created by the user U2, and the camera access user data indicates that the access right to the video data of each of the monitoring cameras Ca1 and Ca2 is granted to the user U2. In accordance with the instruction, the DB server S1 adds, to the database DB1, camera access user data Dt4a to which the data of the setting information of the user U2 is added, in order to constitute the favorite data Dt1a(1) of the store A created by the user U2. Ack that addition of the camera access user data Dt4a to the database DB1 is completed is returned to the user management server S3 and the client terminal PC1, and the camera access user data Dt4a indicates that the user U2 has the right to access the video data of each of the monitoring cameras Ca1 and Ca2.

Further, based on reception of the Ack from the user management server S3, the client terminal PC1 requests the device management server S2 to update the favorite linked camera data constituting the favorite data Dt1a(1) of the store A created by the user U2 (St57). In accordance with the request in step St57, the device management server S2 instructs the DB server S1 to add the data of the setting information of each of the monitoring cameras Ca1 and Ca2 to the favorite linked camera data constituting the favorite data Dt1a(1) of the store A created by the user U2 (St58). In accordance with the instruction, the DB server S1 adds, to the database DB1, the favorite linked camera data Dt2a to which the data of the setting information of each of the monitoring cameras Ca1 and Ca2 is added, in order to constitute the favorite data Dt1a(1) of the store A created by the user U2. Ack that addition of the favorite linked camera data Dt2a to the database DB1 is completed is returned to the device management server S2 and the client terminal PC1. As a result, by the sharing operation performed by the client terminal PC1 which is used by the user U1 (that is, which is permitted to log in as the user U1 based on the setting information of the user U1), the mobile terminal TB1 which is used by the user U2 (that is, which is permitted to log in as the user U2 based on the setting information of the user U2) can create the favorite data Dt1a(1) for the user U2 separate from the favorite data Dt1a created by the user U1, and is set to be able to access the video data of each of the monitoring cameras Ca1 and Ca2 disposed in the store A by the favorite data Dt1a(1), so that these pieces of video data can be viewed remotely.

Third Operation Example

Figure 11:
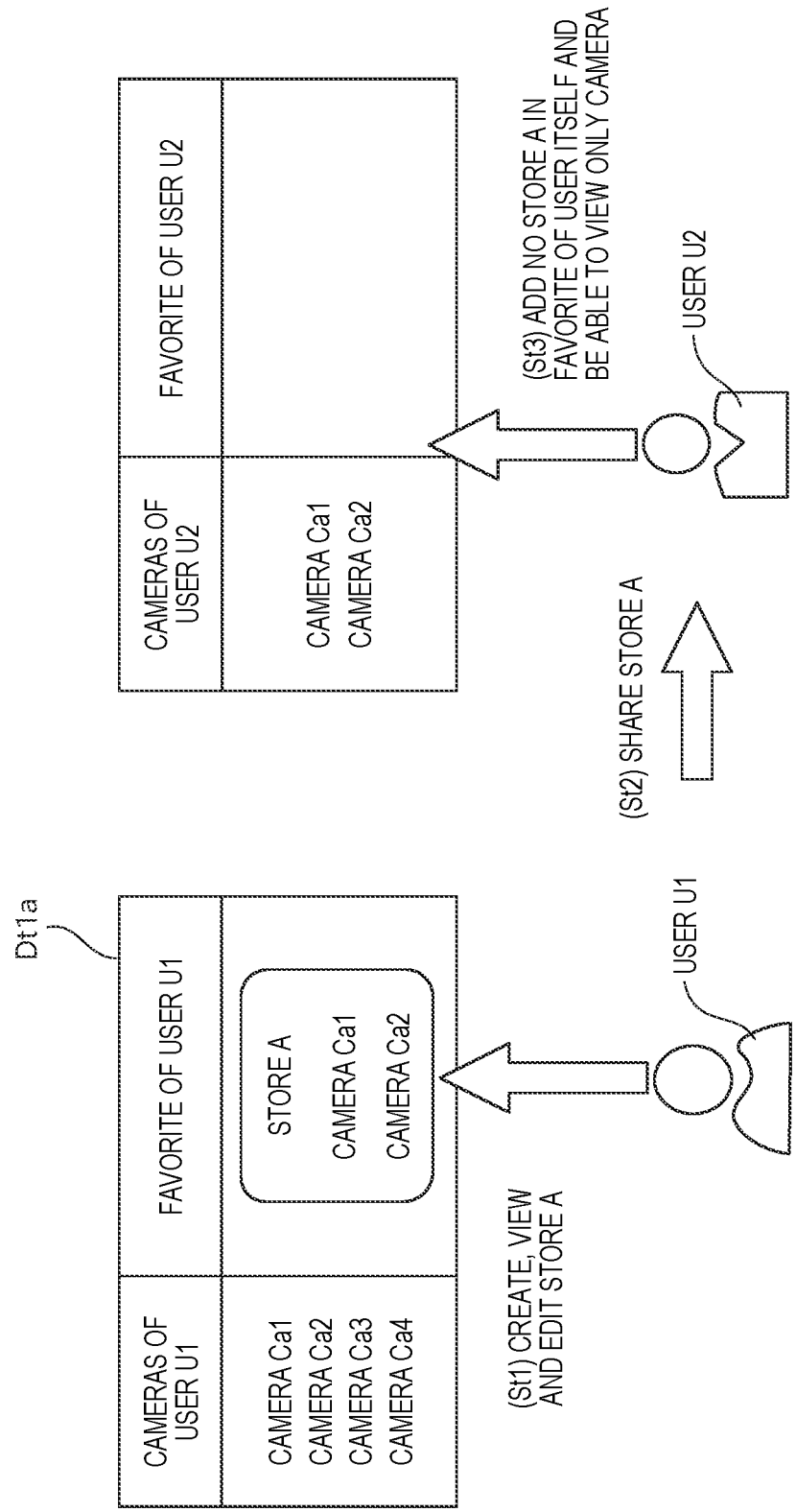
FIG. 11 is a diagram showing an operation outline according to a third operation example.

Next, an outline of a third operation example of sharing processing of favorite data of the monitoring camera system 100 according to the first embodiment will be described with reference to FIG. 11. FIG. 11 is a diagram showing an operation outline according to the third operation example. In the third operation example, similarly to the second operation example, the favorite data Dt1a is data individually created for the user U1 of the monitoring camera system 100.

As shown in FIG. 11, an example will be described in which, for example, the user U1 is registered in advance as the user of the monitoring camera system 100, and the user U2 newly registered as the user of the monitoring camera system 100 is set to be able to access the monitoring cameras Ca1 and Ca2 linked to the favorite data Dt1a created by the user U1. That is, in the third operation example, the favorite data is not created by the user U2, and the data of the setting information of the monitoring camera linked to the favorite data Dt1a created by the user U1 and the data of the setting information of the user U2 who can access the video data of the monitoring camera are registered in the database DB1.

(St1) The user U1 is set to be able to remotely view the video data of each of the monitoring cameras (for example, the four monitoring cameras Ca1, Ca2, Ca3, and Ca4) disposed in the store A. The client terminal PC1 which is used by the user U1 (that is, which is permitted to log in as the user U1 based on the setting information of the user U1) creates, by the operation performed by the user U1, the favorite data Dt1a including the data of the setting information of each of the monitoring cameras Ca1 and Ca2 in the store A. The favorite data Dt1a is the data that acts as the right to access the video data of each of the monitoring cameras Ca1 and Ca2 in the store A selected by the user U1. The creation of the favorite data Dt1a has been described here, and the client terminal PC1 can also edit or delete the favorite data Dt1a by the operation performed by the user U1.

(St2) The client terminal PC1 executes, by the sharing operation performed by the user U1, the sharing processing of sharing the favorite data Dt1a created in step St1 to the user U2. As a result, the mobile terminal TB1 which is used by the user U2 (that is, which is permitted to log in as the user U2 based on the setting information of the user U2) can access the video data of each of the monitoring cameras Ca1 and Ca2 linked to the favorite data Dt1a created by the user U1, and enables remote viewing.

(St3) The user U2 is set to be able to remotely view the video data of each of the monitoring cameras Ca1 and Ca2 by the sharing operation in step St2. The mobile terminal TB1 which is used by the user U2 (that is, which is permitted to log in as the user U2 based on the setting information of the user U2) enables remote viewing of the video data of each of the monitoring cameras Ca1 and Ca2 by an operation performed by the user U2. However, in the third operation example, since data of setting information of the store A is not added to the favorite data created by the user U2 as described above, the mobile terminal TB1 enables only remote viewing of the video data of each of the monitoring cameras Ca1 and Ca2.

Figure 12:
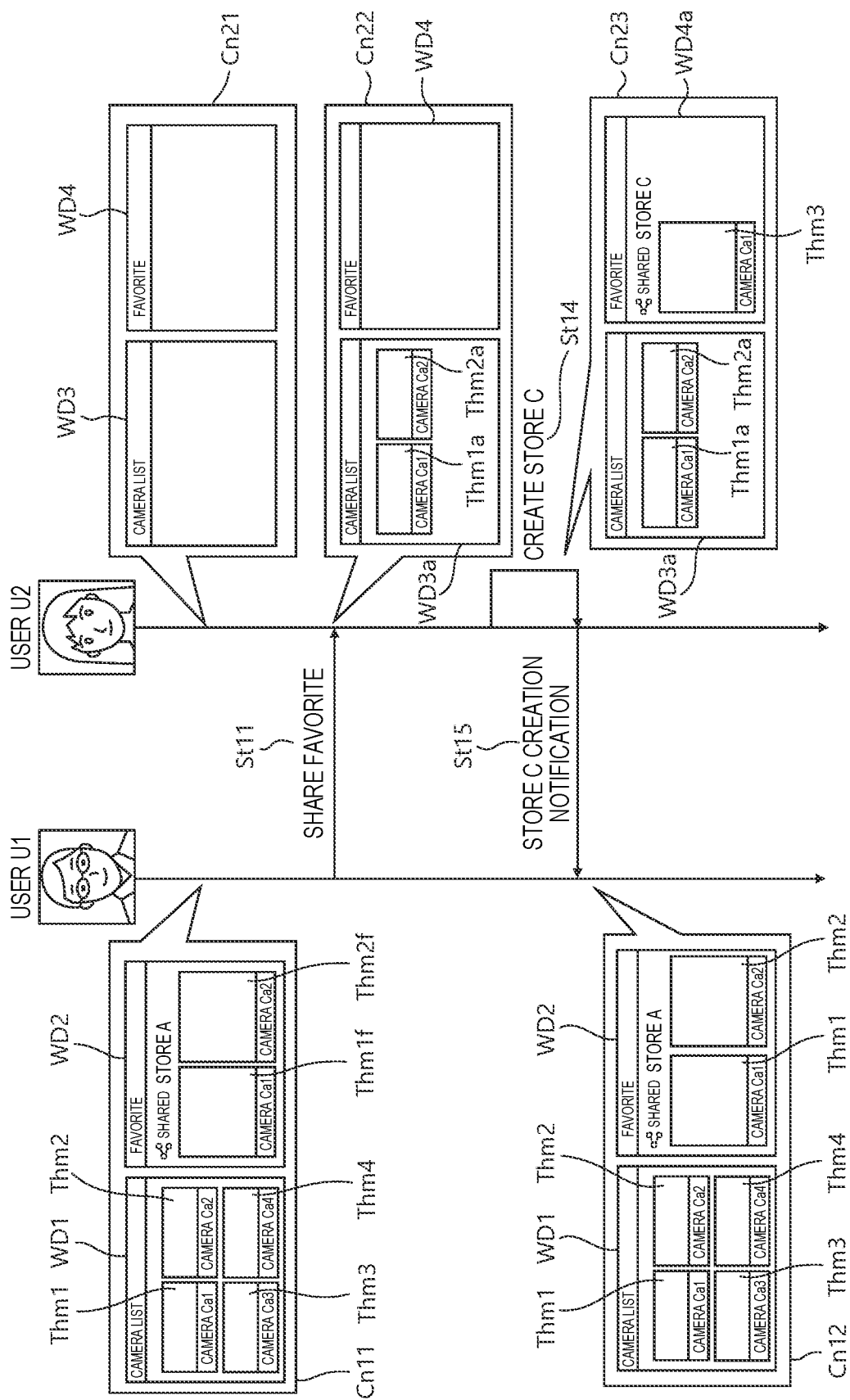
FIG. 12 is a diagram showing an example of transition of a screen displayed on the terminal of each of the users U1 and U2 according to the third operation example.

FIG. 12 is a diagram showing an example of transition of a screen displayed on the terminal of each of the users U1 and U2 according to the third operation example. In FIG. 12, the monitoring camera is simply abbreviated as the camera. In description of FIG. 12, the same elements as those in FIG. 4 are denoted by the same reference numerals, description thereof will be simplified or omitted, and different contents will be described.

In the initial state Cn11 of the client terminal PC1 corresponding to step St1 in FIG. 11, the client terminal PC1 which is used by the user U1 (that is, which is permitted to log in as the user U1 based on the setting information of the user U1) displays, on the camera list screen WD1, the thumbnails Thm1, Thm2, Thm3, and Thm4 each indicating that the video data of a respective one of the monitoring cameras Ca1, Ca2, Ca3, and Ca4 disposed in the store A can be remotely viewed. Further, in response to the creation of the favorite data Dt1a, the client terminal PC1 displays, on the favorite screen WD2, the thumbnails Thm1f and Thm2f each indicating contents of the favorite data Dt1a (for example, indicating that the video data of a respective one of the monitoring cameras Ca1 and Ca2 disposed in the store A can be remotely viewed).

On the other hand, in the initial state Cn21 of the mobile terminal TB1 corresponding to step St1 in FIG. 11, since it is before the sharing processing of the favorite data Dt1a is executed and no monitoring camera accessible by the mobile terminal TB1 is set, the mobile terminal TB1 which is used by the user U2 (that is, which is permitted to log in as the user U2 based on the setting information of the user U2) displays the camera list screen WD3 and the favorite screen WD4 on each of which no thumbnail of the monitoring camera is displayed.

For example, it is assumed that correspondingly to step St2 in FIG. 11, the user U1 performs the sharing operation of sharing the favorite data Dt1a to the user U2 (St11).

By the operation in step St11, the data of the setting information of the monitoring camera linked to the favorite data Dt1a created by the user U1, and the data of the setting information of the user U2 who can access the video data of the monitoring camera are registered in the database DB1. Therefore, in the state Cn22 of the mobile terminal TB1, the mobile terminal TB1 cannot acquire the favorite data such as the favorite data Dt1a of the store A created by the user U1, and can access only the video data of each of the monitoring cameras Ca1 and Ca2. Therefore, the mobile terminal TB1 displays and updates, on the camera list screen WD3a, the thumbnails Thm1a and Thm2a each indicating that the video data of a respective one of the monitoring cameras Ca1 and Ca2 can be remotely viewed, but does not update display on the favorite screen WD4.

For example, it is assumed that the favorite data for enabling access to video data of a monitoring camera Cc1 disposed in a store C created by the user U2 is created by an operation performed by the user U2 (St14).

In the state Cn23 of the mobile terminal TB1, the mobile terminal TB1 displays and updates the thumbnail Thm3 indicating contents of the favorite data (for example, indicating that the video data of the monitoring camera Cc1 disposed in the store C can be remotely viewed) on the favorite screen WD4a by a creation operation of the favorite data in step St14. In addition, the mobile terminal TB1 transmits, to the user management server S3, a notification (store C creation notification) indicating that the creation of the favorite data in step St14 is performed (see St15 in FIG. 12). The user management server S3 performs the same processing as processing shown in FIG. 9, and instructs the DB server S1 to add the favorite data created in step St14. Based on the instruction from the user management server S3, the DB server S1 adds data of setting information of the monitoring camera Cc1 to the favorite linked camera data constituting the favorite data. Ack that the favorite data created by the user U2 is added to the DB server S1 is returned to the mobile terminal TB1. The Ack may also be transferred to the other client terminal PC1.

In the state Cn12 of the client terminal PC1, even when the client terminal PC1 receives Ack that the favorite data created by the user U2 is added to the DB server S1, the client terminal PC1 continues to display the same favorite screen WD2 as the favorite screen WD2 in the initial state Cn11 without updating the display on the favorite screen WD2 in the initial state Cn11. It is because, in the third operation example as described above, the favorite data Dt1a of the user U1 and the favorite data of the user U2 are separately created as in the second operation example so that editing of one favorite data does not affect contents of the other favorite data.

Figure 13:
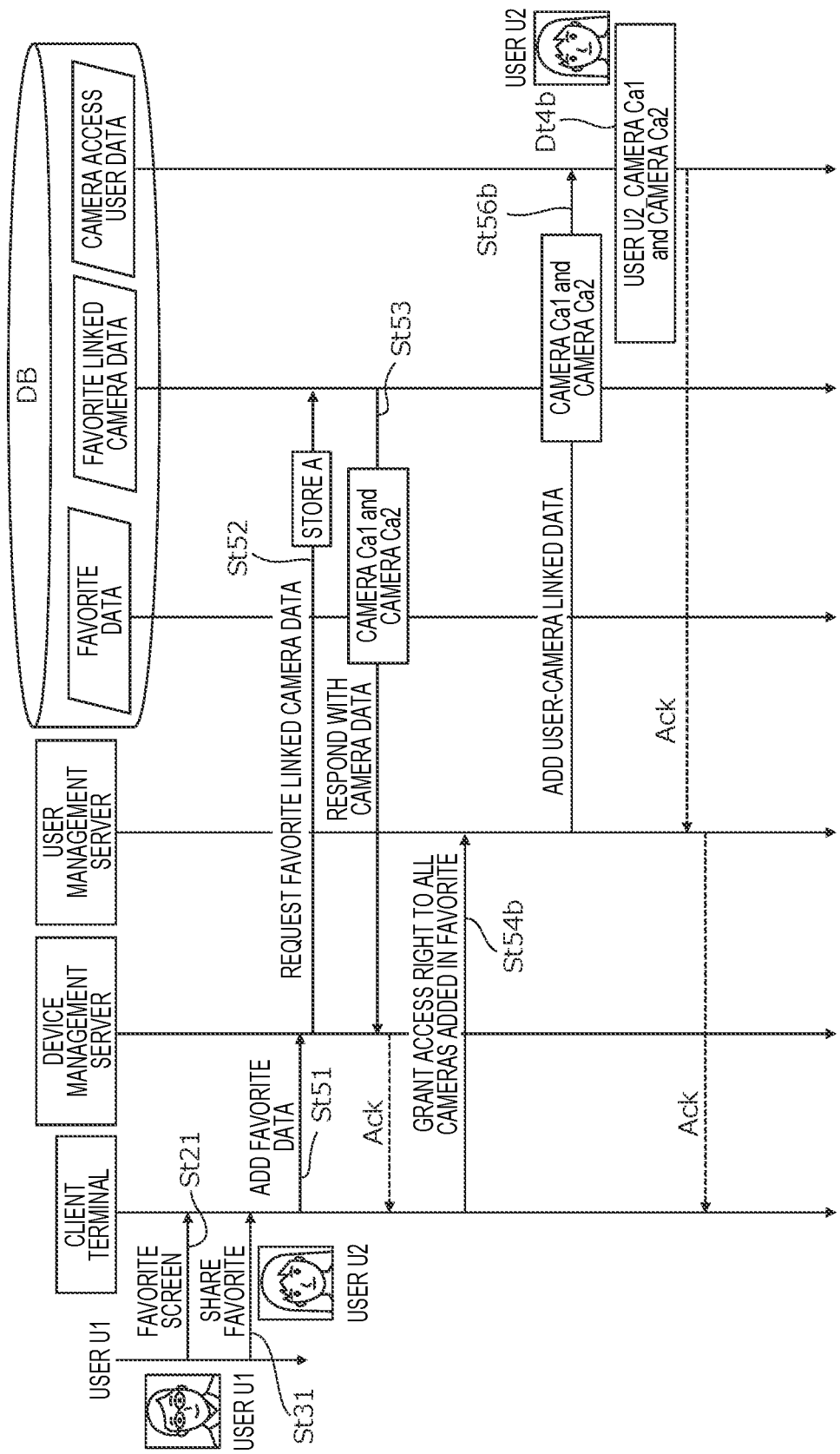
FIG. 13 is a sequence diagram showing, in time series, an operation procedure of sharing processing of favorite data according to the third operation example.

FIG. 13 is a sequence diagram showing, in time series, an operation procedure of the sharing processing of the favorite data according to the third operation example. In description of FIG. 13, processing performed by each server is mainly executed by the processor included in the server. In the description of FIG. 13, the same processing as those in the description of FIG. 5 are denoted by the same step numbers, description thereof will be simplified or omitted, and different contents will be described.

In FIG. 13, based on reception of Ack from the device management server S2, the client terminal PC1 requests the user management server S3 to grant the access right to the video data of each of all the monitoring cameras Ca1 and Ca2 registered in the favorite data created by the user U1 (St54b). In accordance with the request in step St54b, the user management server S3 instructs the DB server S1 to add the data of the setting information of the user U2 to camera access user data Dt4b for enabling access to the video data of each of the monitoring cameras Ca1 and Ca2 (St56b). In accordance with the instruction, the DB server S1 adds the data of the setting information of the user U2 in the camera access user data Dt4b to the database DB1. Ack that addition of the data of the setting information of the user U2 in the camera access user data Dt4b to the database DB1 is completed is returned from the DB server S1 to the user management server S3 and the client terminal PC1. As a result, by the sharing operation performed by the client terminal PC1 which is used by the user U1 (that is, which is permitted to log in as the user U1 based on the setting information of the user U1), the mobile terminal TB1 which is used by the user U2 (that is, which is permitted to log in as the user U2 based on the setting information of the user U2) cannot create the favorite data for the user U2 separate from the favorite data Dt1a created by the user U1, but is set to be able to access the video data of each of the monitoring cameras Ca1 and Ca2 registered in the favorite data Dt1a, so that these pieces of video data can be viewed remotely.

As described above, the monitoring camera system 100 according to the first embodiment includes: one or more user terminals configured to enable viewing of video data of each of a plurality of monitoring cameras disposed in a target facility; and a server configured to store access permission data that includes at least first user information and monitoring camera information. The first user information includes an access right to the video data of each of the monitoring cameras, and the monitoring camera information indicates information of at least one selected monitoring camera selected by an operation of the user terminal based on the first user information. The first user information is, for example, setting information (for example, a right of a user) for permitting the user U1 to log in as the user of the monitoring camera system 100. The user terminal based on the first user information is, for example, the client terminal PC1 which is used by the user U1 (that is, which is permitted to log in as the user U1 based on the setting information of the user U1). The target facility is, for example, the store. The selected monitoring cameras are, for example, the monitoring cameras Ca1 and Ca2. The monitoring camera information is, for example, the data of the setting information of each of the monitoring cameras Ca1 and Ca2. The access permission data is, for example, the favorite data. The server is, for example, the DB server S1, the device management server S2, and the user management server S3. The server is configured to update the access permission data by adding an access right to the video data of the selected monitoring camera to second user information based on sharing processing of the access permission data to the second user information, and set the video data of the selected monitoring camera linked to the access permission data and specified by the monitoring camera information such that the video data of the selected monitoring camera is accessible by the user terminal based on the second user information. The sharing processing is performed by the operation of the user terminal based on the first user information. The second user information is, for example, setting information (for example, a right of a user) for permitting the user U2 to log in as the user of the monitoring camera system 100. The user terminal based on the second user information is, for example, the mobile terminal TB1 which is used by the user U2 (that is, which is permitted to log in as the user U2 based on the setting information of the user U2).

As a result, by the sharing operation of the favorite data of the at least one monitoring camera selected by the user terminal based on the first user information, the monitoring camera system 100 can easily perform data sharing, to the user terminal based on the second user information, of the video data of the at least one monitoring camera specified by the favorite data, and can improve efficiency of data sharing.

The access permission data further includes facility information (for example, information of the store A) indicating information of the target facility in which the selected monitoring camera is disposed. As a result, the favorite data includes the data of the setting information of the store A selected by the user terminal based on the first user information (for example, the client terminal PC1), so that it is possible to simplify confirmation of where the monitoring camera including the video data is located.

The access permission data is a single piece of data that is sharable by the user terminal based on the first user information and the user terminal based on the second user information. As a result, an operation of editing, adding, and deleting the contents of the favorite data by one user terminal affects use of the other user terminal, and convenience can be improved.

The server is configured to, after the sharing processing of the access permission data, cause a display screen to be displayed in the same screen layout on a user terminal based on the first user information and a user terminal based on the second user information. The display screen includes the video data of the selected monitoring camera linked to the access permission data and specified by the monitoring camera information, and the information of the target facility. As a result, in a form in which a preference of one user who creates the favorite data is reflected, the other user who receives the shared favorite data can view the video data of the selected monitoring camera in a screen form of the same layout.

The server is configured to, based on deletion processing of some selected monitoring cameras among the selected monitoring cameras linked to the access permission data and specified by the monitoring camera information, set only video data of a selected monitoring camera left after the deletion processing such that only the video data of the selected monitoring camera is accessible by each of the user terminal based on the first user information and the user terminal based on the second user information, and the deletion processing is performed by the user terminal based on the second user information. As a result, for example, the data of the setting information of the selected monitoring camera for which remote monitoring by both users is not required can be easily deleted from the favorite data by the deletion processing performed by the user terminal based on the first user information or the user terminal based on the second user information, so that maintenance of the favorite data is expected to be easy.

The access permission data includes first access permission data and second access permission data. The first access permission data is provided to enable at least one of creation, editing, and access performed by only a user terminal based on the first user information, and the second access permission data is provided to enable at least one of creation, editing, and access performed by only a user terminal based on the second user information. The first access permission data is the favorite data of the user U1 created by the user U1. Similarly, the second access permission data is the favorite data of the user U2 created by the user U2. As a result, creation, editing, or access of the favorite data is individually set for each user, so that it is possible to operate the favorite data with high degree of freedom in a form in which the preference for each user is reflected.

The server is configured to, after sharing processing of the first access permission data, create and store the second access permission data which is a copy of the first access permission data. As a result, the user U2 can easily share the favorite data having the same contents as those of the favorite data of the user U1.

The server is configured to, after sharing processing of the first access permission data, cause a first display screen to be displayed on the user terminal based on the first user information, and cause a second display screen to be displayed on the user terminal based on the second user information. The first display screen includes the video data of the selected monitoring camera linked to the first access permission data and specified by the monitoring camera information, and information of the target facility. The second display screen includes the video data of the selected monitoring camera linked to the second access permission data and specified by the monitoring camera information, and the information of the target facility. The first display screen and the second display screen are formed to have the same layout. The first display screen is, for example, the favorite screen WD2a of the client terminal PC1. The second display screen is, for example, the favorite screen WD4a of the mobile terminal TB1. As a result, the favorite data are stored in the database DB1 so as to be different for each user, and in the form in which the preference, for the display screen layout, of one user who creates the favorite data is reflected, the other user who receives the shared favorite data can view the video data of the selected monitoring camera in a screen form of the same display screen layout.

The server is configured to, based on deletion processing of some selected monitoring cameras among the selected monitoring cameras linked to the second access permission data and specified by the monitoring camera information, set video data of a selected monitoring camera left after the deletion processing such that only the video data of the selected monitoring camera is accessible by the user terminal based on the second user information, and set the video data of the selected monitoring camera specified by the first access permission data and not subject to the deletion processing such that the video data of the selected monitoring camera is accessible by the user terminal based on the first user information. The deletion processing is performed by the user terminal based on the second user information. As a result, even when the user U2 performs, using the mobile terminal TB1, an operation of removing a selected monitoring camera for which monitoring is not required among the selected monitoring cameras specified by the favorite data of the user U2 itself, a configuration of the favorite data of the other user (for example, the user U1) is not affected, and the user U1 can view, based on the favorite data linked to the user U1, the video data of the corresponding selected monitoring camera, in order to perform monitoring.

The server is configured to, after sharing processing of the first access permission data, cause a first display screen to be displayed on the user terminal based on the first user information, and cause a second display screen to be displayed on the user terminal based on the second user information. The first display screen includes the video data of the selected monitoring camera linked to the first access permission data and specified by the monitoring camera information, and information of the target facility. The second display screen includes the video data of the selected monitoring camera linked to the second access permission data and specified by the monitoring camera information. As a result, even when the favorite data of the user U2 itself is not created, the monitoring camera system 100 can remotely view, by the favorite data of the user U1, the video data of the monitoring camera to be monitored, in order to perform monitoring.

Although various embodiments have been described above with reference to the drawings, it is needless to say that the present disclosure is not limited to such examples. It will be apparent to those skilled in the art that various changes, modifications, substitutions, additions, deletions, and equivalents can be conceived within the scope of the claims, and it should be understood that these changes, modifications, substitutions, additions, deletions, and equivalents also naturally belong to the technical scope of the present disclosure. Components in various embodiments described above may be combined freely within a range not deviating from the spirit of the invention.

INDUSTRIAL APPLICABILITY

The present disclosure is useful as a monitoring camera video sharing system and a monitoring camera video sharing method that improve efficiency of data sharing of a video of at least one monitoring camera.

What is claimed is:

1. A monitoring camera video sharing system, comprising:
   a plurality of user terminals configured to enable viewing of video data of each of a plurality of monitoring cameras disposed in a target facility, the plurality of user terminal including a first user terminal and a second user terminal; and
   a server configured to store favorite data for the target facility, the favorite data including setting information of each of the plurality of monitoring cameras, the favorite data including an access right to the video data of each of the plurality of monitoring cameras, the favorite data indicating information of the plurality of monitoring cameras selected by an operation of the first user terminal based on first user information of the first user terminal, the first user information of the first user terminal being added the favorite data by the server,
   wherein the first user terminal is configured to transmit the favorite data, which is stored in the server and includes the setting information of each of the plurality of monitoring cameras, to the second user terminal in response to a sharing operation performed by the first user terminal in order to provide the access right to the video data of each of the plurality of monitoring cameras to the second user terminal, and
   the server, in accordance with the sharing operation, is configured to
      add second user information of the second user terminal to the favorite data stored by the server, and
      provide the access right to the video data of each of the plurality of monitoring cameras to the second user terminal based on the second user information.

2. The monitoring camera video sharing system according to claim 1,
   wherein the favorite data further includes facility information indicating information of the target facility in which the plurality of monitoring cameras is disposed.

3. The monitoring camera video sharing system according to claim 2,
   wherein the server is configured to, after the sharing operation, cause a display screen to be displayed in a same screen layout on the first user terminal based on the first user information and on the second user terminal based on the second user information, the display screen including the video data of each of the plurality of monitoring cameras linked to the favorite data.

4. The monitoring camera video sharing system according to claim 3,
wherein the server is configured to, based on deletion processing of some of the plurality of monitoring cameras linked to the favorite data, set only video data of selected monitoring cameras left after the deletion processing such that only video data of the selected monitoring cameras is accessible by each of the first user terminal and the second user terminal, the deletion processing being performed by the second user terminal.

5. The monitoring camera video sharing system according to claim 1,
wherein the favorite data is sharable by the first user terminal.

6. The monitoring camera video sharing system according to claim 1,
wherein the favorite data includes first access permission data and second access permission data, the first access permission data being provided to enable at least one of creation, editing, and access performed by only the first user terminal based on the first user information, and the second access permission data being provided to enable at least one of creation, editing, and access performed by only the second user terminal based on the second user information.

7. The monitoring camera video sharing system according to claim 6,
wherein the server is configured to, after sharing processing of the first user terminal transmitting the favorite data to the second user terminal, create and store second access permission data which is a copy of first access permission data.

8. The monitoring camera video sharing system according to claim 6,
wherein the server is configured to, after sharing processing of the first user terminal transmitting the favorite data to the second user terminal, cause a first display screen to be displayed on the first user terminal based on the first user information, and cause a second display screen to be displayed on the second user terminal based on the second user information, the first display screen including the video data of the plurality of monitoring cameras linked to first access permission data and specified by the favorite data, and information of the target facility, and the second display screen including the video data of the plurality of monitoring cameras linked to second access permission data and specified by the favorite data, and the information of the target facility, and
wherein the first display screen and the second display screen are formed to have a same layout.

9. The monitoring camera video sharing system according to claim 6,
wherein the server is configured to, based on deletion processing of some selected monitoring cameras among the plurality of monitoring cameras linked to second access permission data and specified by the favorite data, set video data of a selected monitoring camera left after the deletion processing such that only the video data of the selected monitoring camera is accessible by the second user terminal, and set the video data of the plurality of monitoring cameras specified by first access permission data and not subject to the deletion processing such that the video data of the plurality of monitoring cameras is accessible by the first user terminal, the deletion processing being performed by the second user terminal.

10. The monitoring camera video sharing system according to claim 6,
wherein the server is configured to, after sharing processing of the first user terminal transmitting the favorite data to the second user terminal, cause a first display screen to be displayed on the first user terminal, and cause a second display screen to be displayed on the second user terminal, the first display screen including the video data of the plurality of monitoring cameras linked to first access permission data and specified by the favorite data, and information of the target facility, and the second display screen including the video data of the plurality of monitoring cameras linked to second access permission data and specified by the favorite data.

11. The monitoring camera video sharing system according to claim 1,
wherein the setting information of each of the plurality of monitoring cameras, which is transmitted from the first user terminal to the second user terminal with the favorite data, includes a name and an identification number of each of the plurality of monitoring cameras, the setting information further including a date and a time of disposition in the target facility.

12. The monitoring camera video sharing system according to claim 1,
wherein the setting information of each of the plurality of monitoring cameras, which is transmitted from the first user terminal to the second user terminal with the favorite data, includes a name of each of the first user terminal and the second user terminal.

13. The monitoring camera video sharing system according to claim 1,
wherein the second user terminal is configured to perform an editing operation to delete one of the plurality of monitoring cameras.

14. The monitoring camera video sharing system according to claim 1,
wherein, in response to the editing operation of the second user terminal, the server deletes data of setting information of the one of the plurality of monitoring cameras from the favorite data.

15. A monitoring camera video sharing method for a target facility, the target facility including a plurality of monitoring cameras, the monitoring camera video sharing method comprising:
storing, in a server, favorite data for the target facility, the favorite data including setting information of each of the plurality of monitoring cameras, the favorite data including an access right to video data of each of the plurality of monitoring cameras disposed in the target facility, the favorite data indicating information of the plurality of monitoring cameras selected by an operation of a first user terminal based on first user information of the first user terminal, the first user information of the first user terminal being added the favorite data by the server;
transmitting, by the first user terminal and to a second user terminal, the favorite data, which is stored in the server and includes the setting information of each of the plurality of monitoring cameras, in response to a sharing operation performed by the first user terminal in order to provide the access right to the video data of each of the plurality of monitoring cameras to the second user terminal;
adding second user information of the second user terminal to the favorite data stored by the server; and
providing the access right to the video data of each of the plurality of monitoring cameras to the second user terminal based on the second user information.

* * * * *